US005572433A

United States Patent [19]

Falconer et al.

[11] Patent Number: 5,572,433
[45] Date of Patent: Nov. 5, 1996

[54] DETECTION OF MARKS REPETITIVELY PLACED AT LENGTHWISE INTERVALS ALONG A WEB

[75] Inventors: Andrew P. Falconer, Marlow Bottom; Peter T. Herdman, High Wycombe, both of England

[73] Assignee: The Wiggins Teape Group Limited, Basingstoke, United Kingdom

[21] Appl. No.: 87,288

[22] Filed: Jul. 8, 1993

[30] Foreign Application Priority Data

Jul. 10, 1992 [GB] United Kingdom ............... 9214664

[51] Int. Cl.$^6$ ................................... G06F 19/00
[52] U.S. Cl. ................. 364/471.01; 226/2; 226/28
[58] Field of Search ............. 364/469–471, 364/558; 250/548, 557; 356/401, 428; 226/2, 8, 10, 27, 28

[56] References Cited

U.S. PATENT DOCUMENTS

| | | | |
|---|---|---|---|
| 4,514,819 | 4/1985 | Punater et al. | 364/556 |
| 4,794,453 | 12/1988 | Gnuechtel et al. | 358/101 |
| 5,018,213 | 5/1991 | Sikes | 364/469 |
| 5,119,725 | 6/1992 | Okamura | 101/226 |
| 5,223,720 | 6/1993 | Weyer | 250/548 |
| 5,247,462 | 9/1993 | Blasius et al. | 364/559 |
| 5,249,139 | 9/1993 | Blasius et al. | 364/526 |

FOREIGN PATENT DOCUMENTS

| | | |
|---|---|---|
| 0390389 | 10/1990 | European Pat. Off. . |
| 0485691 | 5/1992 | European Pat. Off. . |
| 2659899 | 9/1991 | France . |
| 2126714 | 3/1984 | United Kingdom . |
| WO88/03119 | 5/1988 | WIPO . |

*Primary Examiner*—Roy N. Envall, Jr.
*Assistant Examiner*—Thomas E. Brown
*Attorney, Agent, or Firm*—Burns, Doane, Swecker & Mathis, L.L.P.

[57] ABSTRACT

A system is disclosed for detecting watermarks or other marks made along a web of paper at regular intervals. The watermarks are detected by a video camera activated by a frame grabbing pulse in a control loop. The video for each frame grab pulse signal is digitized and processed to detect the watermark and to measure its position within the frame. The error between the measured position and a frame reference is used to adjust the value of a parameter (NEW-COUNT) representing the distance or pitch between successive watermarks. This value is in turn used to determine the moment of the next or a succeeding frame grab pulse. All timing is done in terms of measured length of web run by measuring pulses from an encoder. The control loop acts to track variations in the watermark pitch. The system may include circuitry for detecting and measuring every Mth mark while at the same time generating an interpolated pulse for each watermark usable in the control of a machine for cutting sheets of stationery paper from the web. Procedures are also described for automatically acquiring initial detection of watermarks on running the web up to speed. A fast infra-red strobe apparatus cooperable with the camera is also described as a source for illuminating the web.

30 Claims, 12 Drawing Sheets

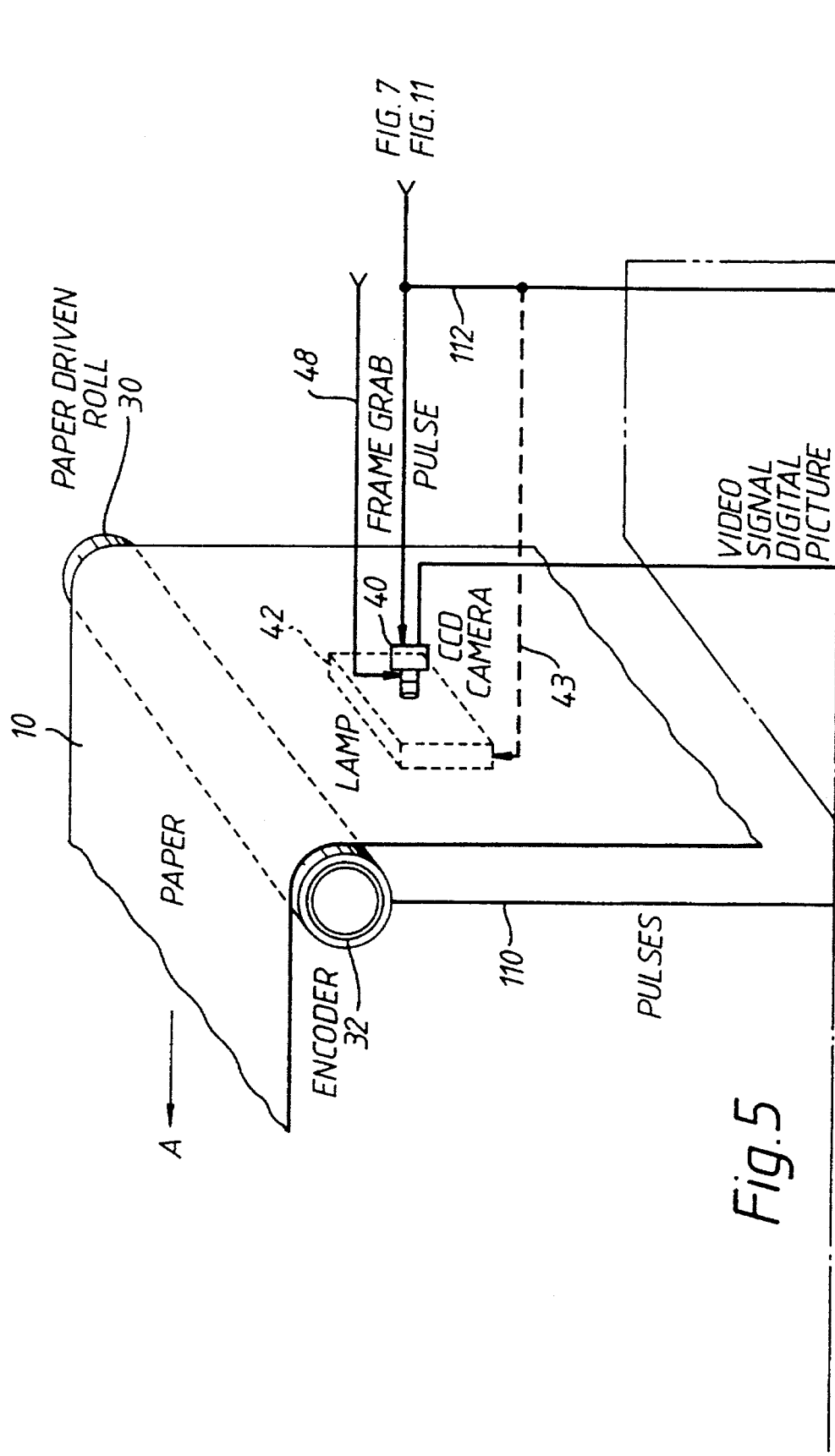

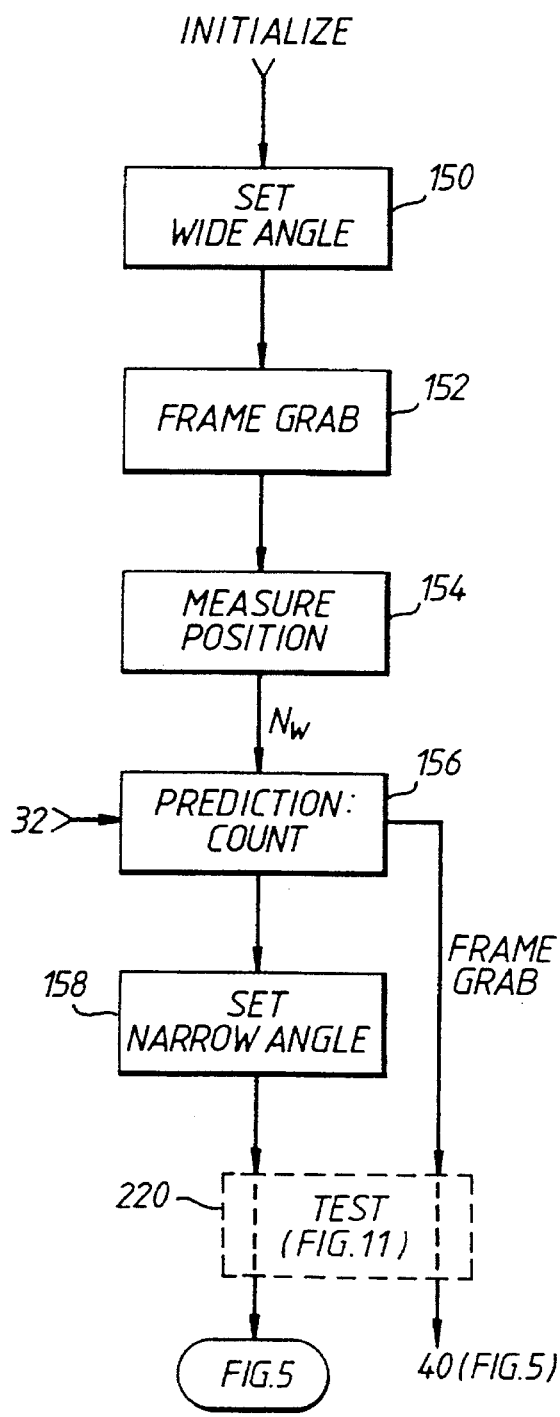
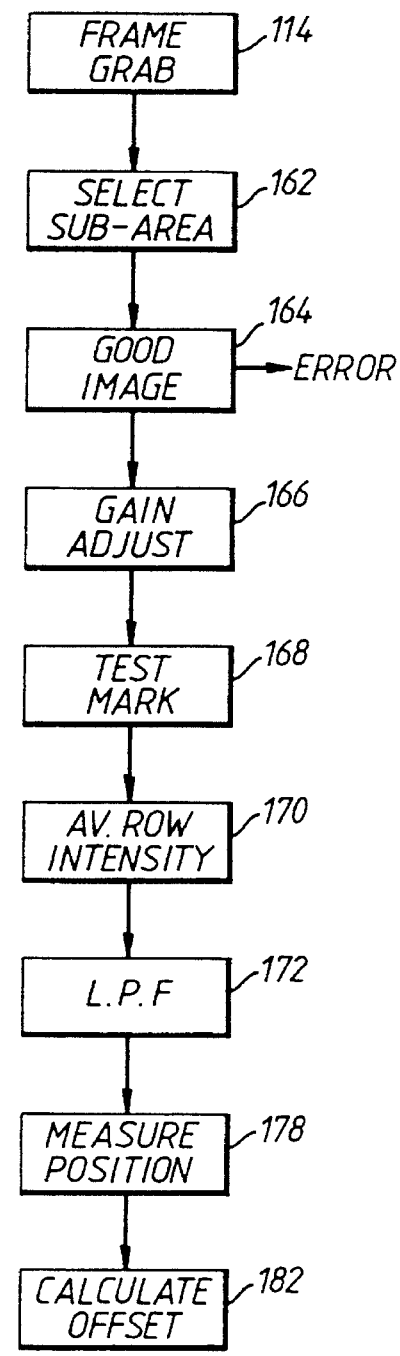
Fig. 7
Fig. 8

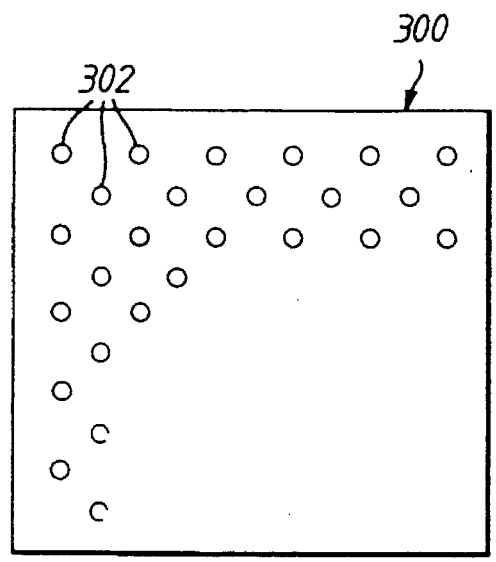
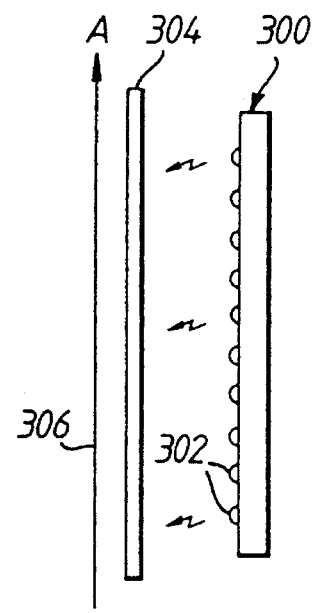
Fig.14(a)          Fig.14(b)
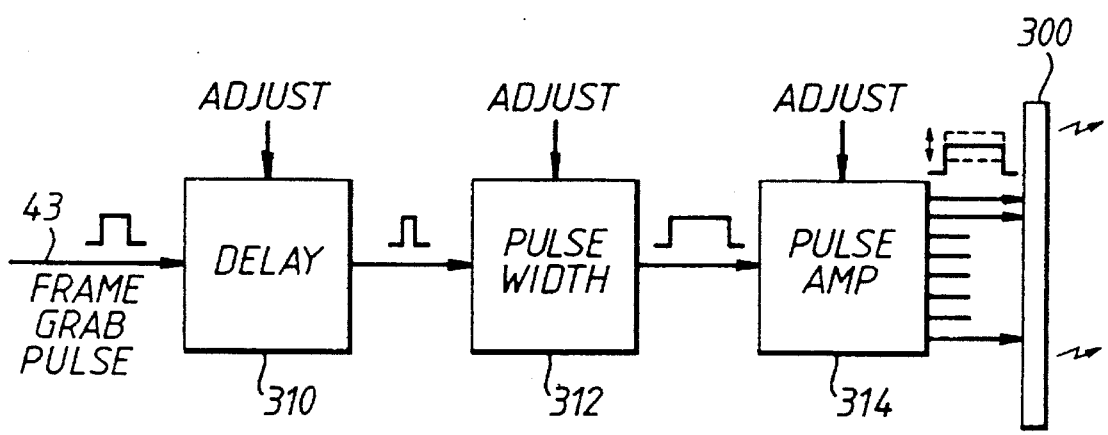
Fig.15

DETECTION OF MARKS REPETITIVELY PLACED AT LENGTHWISE INTERVALS ALONG A WEB

This invention relates to the detection of marks repetitively made lengthwise along a web. A particular application of the invention is to the detection of watermarks on a web of paper.

In the manufacture of high quality stationery, the manufacturers' watermark is applied at intervals along the web corresponding to the position of the sheets to be cut from the web. The web is several sheets wide and the watermarking is applied in rows across the web. The watermarking is applied early in the manufacture of the web in a paper machine. Watermarking is done by means of a dandy roll that acts on the wet web forming on the Foudrinier wire. To this end the dandy roll carries rows of metallic designs of the watermark.

In general the rotational speed of the dandy roll relative to the wire is to be controlled such that the web carries watermarks at the desired longitudinal intervals in its finished form, that is the web as finally reeled up after drying. Dimensional changes in the web occur during its passage through the paper machine. The control of the paper machine and particularly the dandy roll to achieve the desired watermark spacings on the final dried web is not the concern of this invention.

The normal practice for the production of watermarked stationery is that the dried web is reeled up at the end of the paper-making machine. At a later time the reeled-up web is taken and fed to a sheeting machine (sheeter). In this machine the web is slit longitudinally and cut transversely, these two tasks being performed in close proximity.

In order to understand the operation of the sheeting machine in so far as it sets parameters for the watermark detection procedure, the distinction will be explained between the cut sheet size and the stationery sheet size. For the purpose of discussing and describing this invention, the size of the final stationery sheet will be taken to be A4 by way of example. The sheeting machine may be operated to directly produce A4 size sheets. In this case the size of the cut sheets from the machine is the same (A4) as the stationery sheet size. However, the sheeting machine may be operated to produce cut sheets containing four A4 sheets, say. These larger cut sheets are then cut, as by guillotining, down to the A4 size stationery in a separate operation at a later time. Examples of the application of the invention to both an A4 and a larger cut sheet size are described below. The different cut sheet sizes affect the watermark spacings applied on the web at the dandy roll and these requirements are thus carried through the whole of the handling of the paper from its formation on the wire. There are accepted cut sheet sizes in the industry. The two examples that are discussed in detail below are A4 and that known as RA2.

Initial discussion will concentrate on direct A4 size cutting by the sheeter because this size requires a uniform spacing of the watermarks along the web. In this case the web can be regarded as made up of A4 size sheets lying long edge to long edge across the web, and short edge to short edge along the web. That is, there are no margins between the sheets. The nominal size of an A4 sheet is 297 mm long by 210 mm wide.

A sheeting machine cutting the web to A4 size slits the web lengthwise into sections each equal in width to the width of an A4 sheet: and it cuts the web transversely using what is called a flying knife to divide each lengthwise section into the desired sheet length. The slitting and transverse cutting are performed virtually simultaneously on the web. It is common practice to synchronize the operation of the flying knife with the lengthwise positioning of the watermarks on the web. In this discussion it is assumed that there will be just one watermark per A4 sheet and that preferably the watermark is positioned in a central zone of the sheet. However, the control of the flying cutter is not itself part of the present invention. It will be understood nonetheless that in order to control the flying cutter, the position of the watermarks on the web has to be ascertainable.

The watermarks applied to the web by the dandy roll lie in rows or lines across the web, these rows or lines being nominally spaced by the A4 sheet length of 297 mm. Thus the watermarks in each row are aligned and are equispaced at the A4 sheet width of 210 mm. The lengthwise lines of watermarks are thus also aligned. To give some indication of what the slitting and cutting of the web at the sheeting machine involves in practice, the web is typically ten sheets wide, that is 2.1 m, and is run through the sheeting machine at up to 300 m/min. This equates to a cutting rate of 17 traverses per second by the flying knife.

To date, the synchronizing of the flying knife with the watermark positions has had to be done by way of an indirect detection of watermark position. It has not been possible to detect the sheet watermarks themselves. What has been done is to provide an additional marginal strip about 40 mm wide at one side of the web to which a special watermark configuration is applied as an index or register mark, e.g. in the form of a line. This special index mark is also applied by the dandy roll so as to have a predetermined lengthwise positional relationship with the sheet watermarks. The manufacturers marks are normally of a more complex configuration of a name and/or symbol. The special marginal index marking is detected by a linear array of photo-detectors in an orientation conforming to that of the index mark. The detector array is mounted on one side of the web which is illuminated from the other side. The detection process need not be described here but the detection logic is intended to achieve reliable detection of the special index mark while excluding false detections from other marks that may occur on the web.

The additional edge strip required by present conventional practice also has to be slit from the remainder of the web by the sheeting machine and is returned for repulping into paper stock. The need to form this marginal strip in the paper production process, its removal at the sheeter and subsequent re-pulping represents a considerable waste of energy. In the example given, it represents a waste of about 1.6% which is significant. If paper manufacturers are to consider moving away from use of the wasteful marginal area, it is necessary to provide a reliable detection of and measurement of the position of the sheet watermarks themselves.

In looking to detect the cut sheet watermarks directly, it is only necessary to detect the watermarks along one lengthwise section of the web since the other marks are transversely aligned across the sheet. As will be discussed below, the ability to detect watermarks directly opens up various possibilities for the control of the paper-making process itself, The present invention is concerned with the detection of watermarks and sensing their position and has been particularly developed for controlling the operation of a flying knife in a sheeting machine as discussed above. More particularly the invention has application to the detection of watermarks incorporated in stationery sheets in contrast to other watermarks provided as special register marks as has been described above.

In addition to the above-described practice of using special marginal watermarks as register marks to control the cutting of a paper web for watermarked stationery, there are other technical fields in which proposals have been made to cut a moving web into sections based on the detection of marks along the web. Such proposals are disclosed in the following patent specifications: EP-A-0485691 (Paper Converting Machine Company); WO88/03119 (Adolph Coors Company); and FR-A-2659899 (Gravurex (S.A.R.L.)).

EP-A-0485691 discloses apparatus for cutting diapers from a web into which diaper pads are incorporated. A selected point on each diaper is used as a register mark. These marks are detected ahead of the cutting station and the detection is used to synchronize the cutter rolls at the cutting station with the detected marks if the detected error exceeds set limits. Each detection is initiated by a strobe pulse generated by the rotation of the cutter rolls at fixed spatial intervals. Synchronization is effected from time-to-time by an electro-mechanical correction using a differential in the constant speed drive to the rollers to advance or retard them as required.

The detection procedure in EP-A-0485691 employs a video camera cooperating with a strobe light. The video image is digitized for processing and the position of the register mark is compared with that of a fixed reference mark in the field of view of the video camera. If the error in the measured separation of these marks exceeds the set limits then a correction signal is temporarily generated to retard/advance the cutter rollers.

The procedure in the prior proposals does not actually measure diaper-to-diaper length which is assumed to be equal on average to the spacing of successive cuts determined by the dimensions of the cutter rolls. The synchronizing procedure using a mechanical differential is relatively slow in terms of the cutting of a paper web into stationery sheets. This mechanical element is thereby introduced into the triggering of the strobe.

WO88/03119 discloses another system for controlling cutting of repeated lengths from a web which may be subject to a variable factor such as stretching. The cutter station acts primarily at fixed intervals and provision is made to synchronize the cutting action with register marks indicating the repeat lengths along the web. These are detected by a photo-electric sensor at a measurement station at a known distance preceding the cutting station. The cutting station provides a reference pulse for each cut. An error signal is generated representing the difference between actual and nominal distances between two successive register marks and the error measurements are used in conjunction with the reference pulses from the cutting station to generate an error signal which is used to ensure synchronization between the cutter operation and the arrival of each register mark at the cutting station. The control procedure to maintain synchronization is electro-mechanical. The web speed is adjusted over a short distance preceding the cutter or the cutter operation can be retarded or advanced. Although the apparatus disclosed in WO88/03119 measures a length error between the actual distance between two register marks and their nominal distance, each measurement starts from a basis that the next length in question will be the fixed nominal length and then seeks to compensate for any discrepancy.

FR-A-2659899 discloses performing an operation on labels carried by a moving web in which each label carries a design motif that is detected by a video camera stationed ahead of a cutting station along the web. The captured image is digitized and its position compared with a fixed reference related to the operating tool to synchronize the performance of the operation with the correct positioning of the label with respect to the tool.

In discussion of EP-A-0485691 above, mention was made of the use of a strobe light in conjunction with the video camera to grab the image from the moving web. The strobe light is not specified but the conventional strobe light uses an Xenon lamp. Such strobes can be operated at exposure speeds down to 10 microseconds according to the paper "Machine vision System for Precision Dimensional Measurements and on-line SPC" by Robert L. Horst, 1989 IEEE Industry Applications Society Annual Meeting (Conference Record). We consider 20 microseconds more typical. The conventional strobe provides a visible flash of light concentrated at the blue end of the spectrum. Horst describes a system for measuring the repetition length of some pattern, design etc. repeated along a web. To this end he proposes a pair of cameras spaced apart at the nominal repetition distance and simultaneously activated to capture respective images. The images are digitised, analysed to find a predetermined reference point in each image, and the actual repetition length calculated. This paper only discusses the making of measurements for statistical analysis. It does not disclose any application of the measurements to the control of a process performed on the web.

The Horst paper discloses the use of a camera based on charge-coupled device (CCD) technology. The use of CCD cameras in connection with monitoring webs of paper is discussed in "Deutscher Drucker" 5th Jul., 1990 at page 921. There is a brief discussion under the heading "Abtastung per CCD-Kamera" of the potential use of a CCD-camera to record images of various markings, edges etc. associated with a paper web, including watermarks. But no disclosure of how to use the camera for such purposes is given.

The prior art discussed above does not address several issues which are particularly important to detecting watermarks in paper webs intended for stationery, namely:

the detection should rely solely on the watermarks that will be incorporated in the final stationery sheets;

it is considered desirable to have a system which actually measures and keeps track of sheet length, specifically cut sheet length;

it is desirable that the activation of the detection procedure, e.g. the frame-grabbing by a video camera, be done on the basis of a prediction founded on measurement of current sheet length rather than be generated from a source, such as at the cutting station, which is primarily designed to generate pulses corresponding to the fixed nominal length of the articles being cut from the web;

it is desirable to avoid any mechanical intervention, i.e. mechanical adjustment of any parameter, in the procedure for measuring sheet length, that is to say the whole measurement system should be electronic/software based in the technology currently available;

there would be a great benefit if the acquiring of the watermarks could be done automatically on starting up the apparatus or resuming operation after an interruption, for example breakage of the web;

it is desirable to develop image handling techniques particularly designed to reliably detect watermarks, particularly bearing in mind that the watermark design is chosen more as a trade mark rather than a register mark specifically designed for easy detection.

There will be described hereinafter a method and apparatus applied to watermark detection and measurement of cut sheet length in a paper web intended for the production of stationery. In our view, the method and apparatus to be described meets the criteria set forth above.

The invention and its practice will be further described with reference to the accompanying drawings, in which;

FIG. 7 is flow diagram of the start-up procedure for initially acquiring the watermarks;

FIG. 8 is a more detailed flow diagram of the video processing routing used within a normal running process of FIG. 15;

Figure 5:
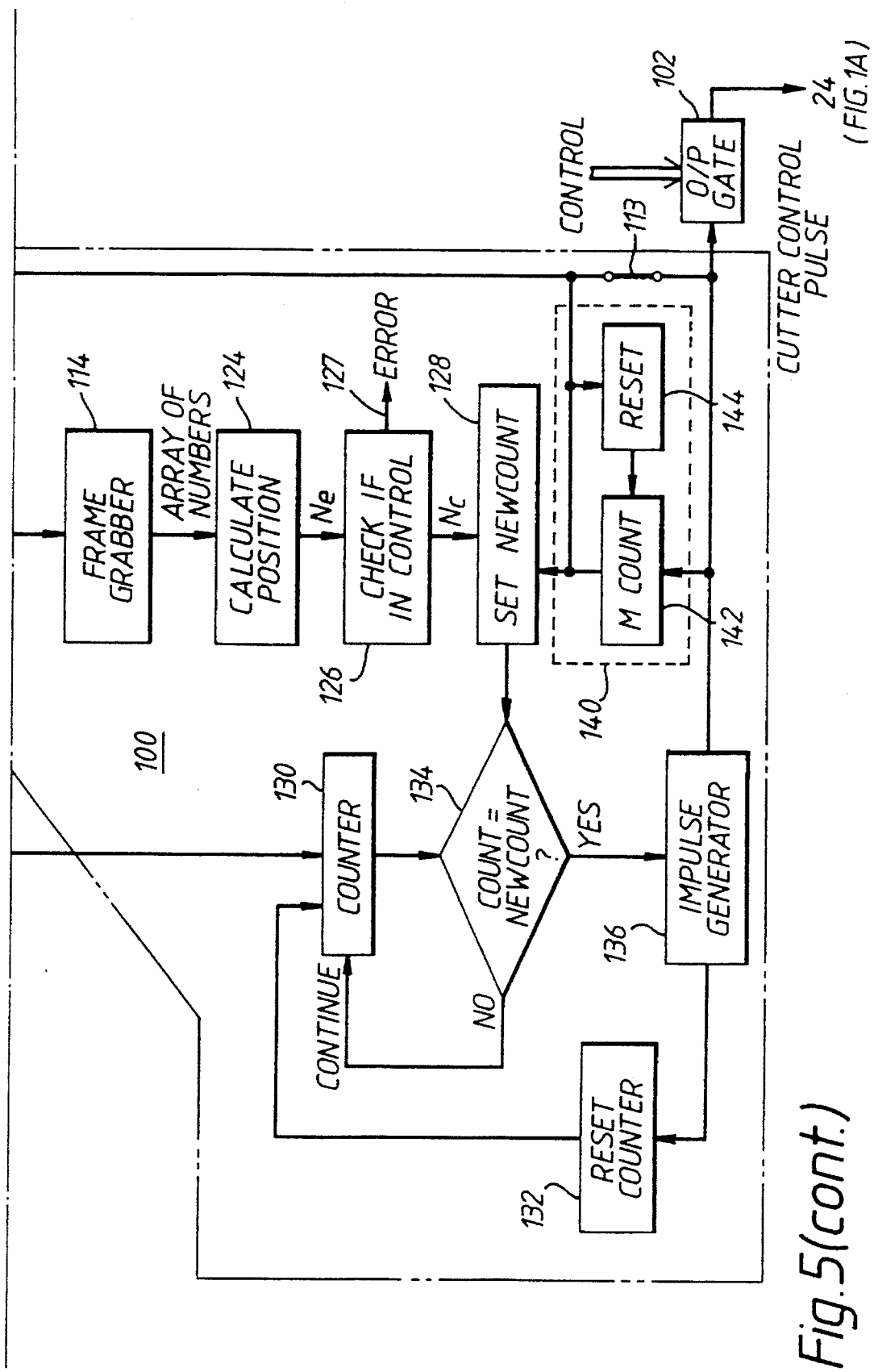
FIG. 5 is a combined hardware/logic diagram for explaining a cycle of normal running operation of a system incorporating the present invention.
Figure 10:
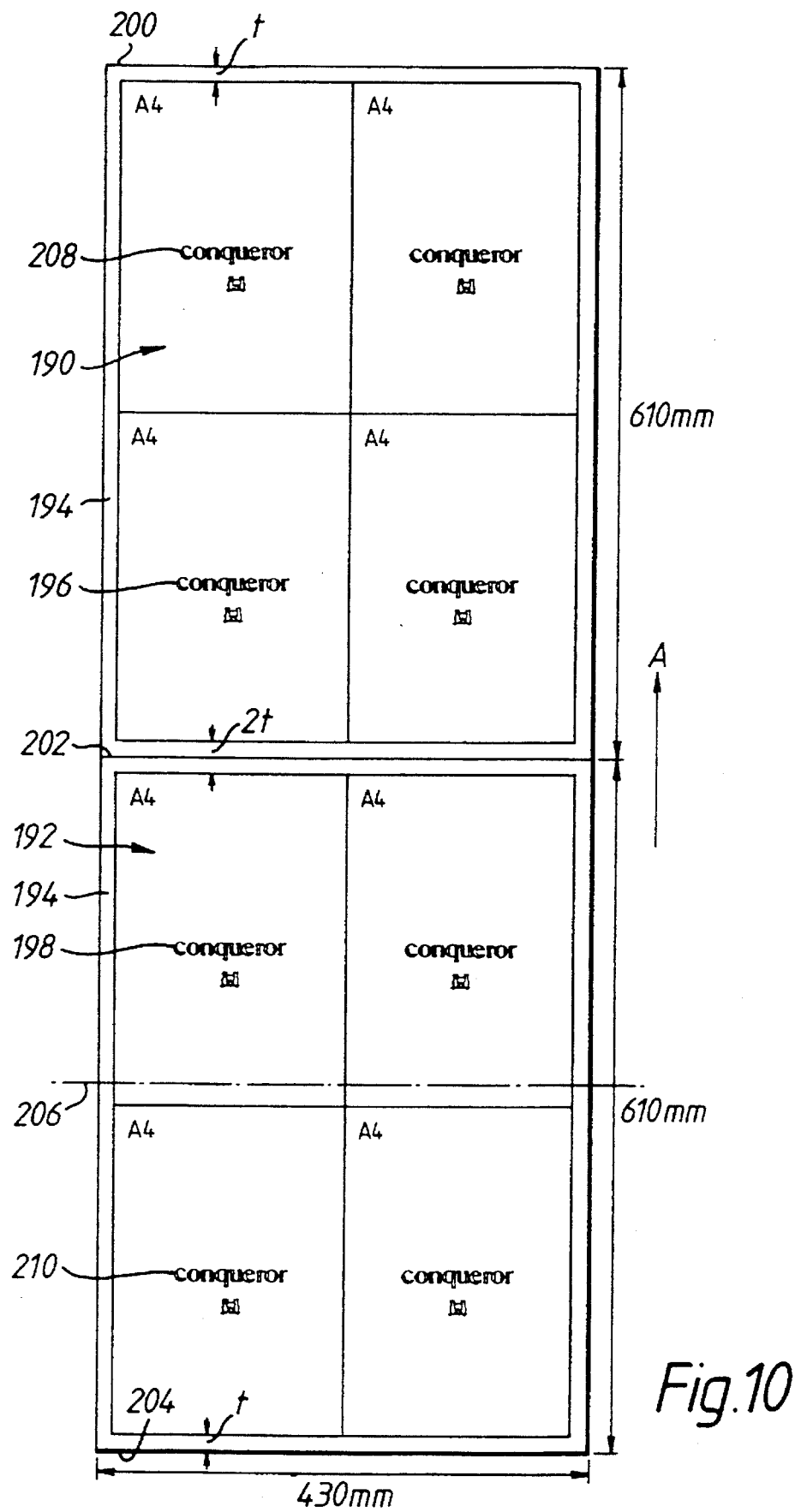
Figure 11:
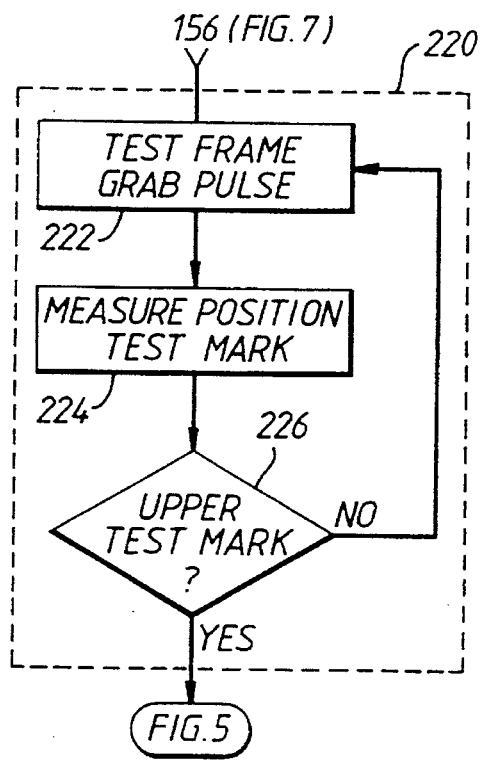
Figures 12A, 12B, 12C, 12D:
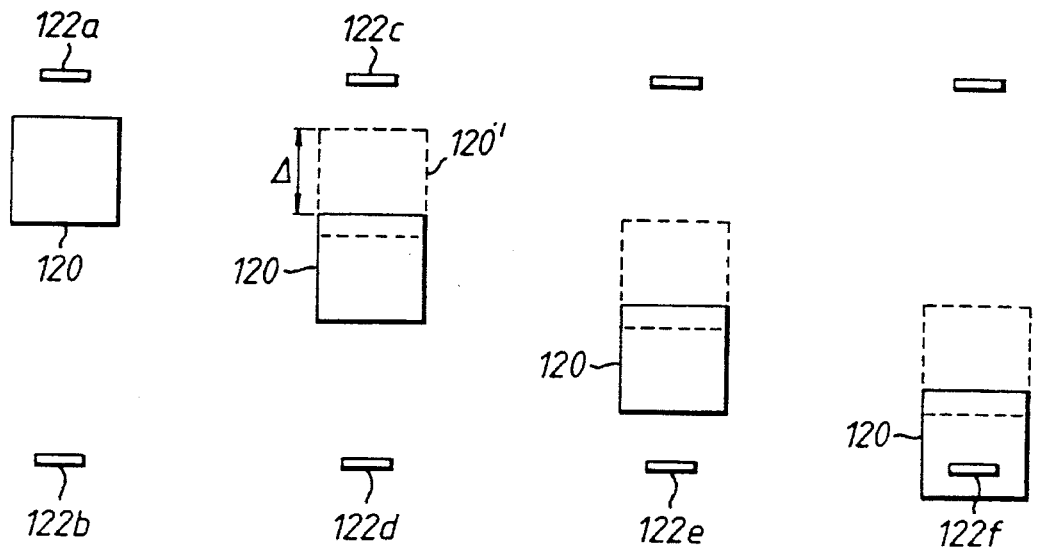
Figure 13:
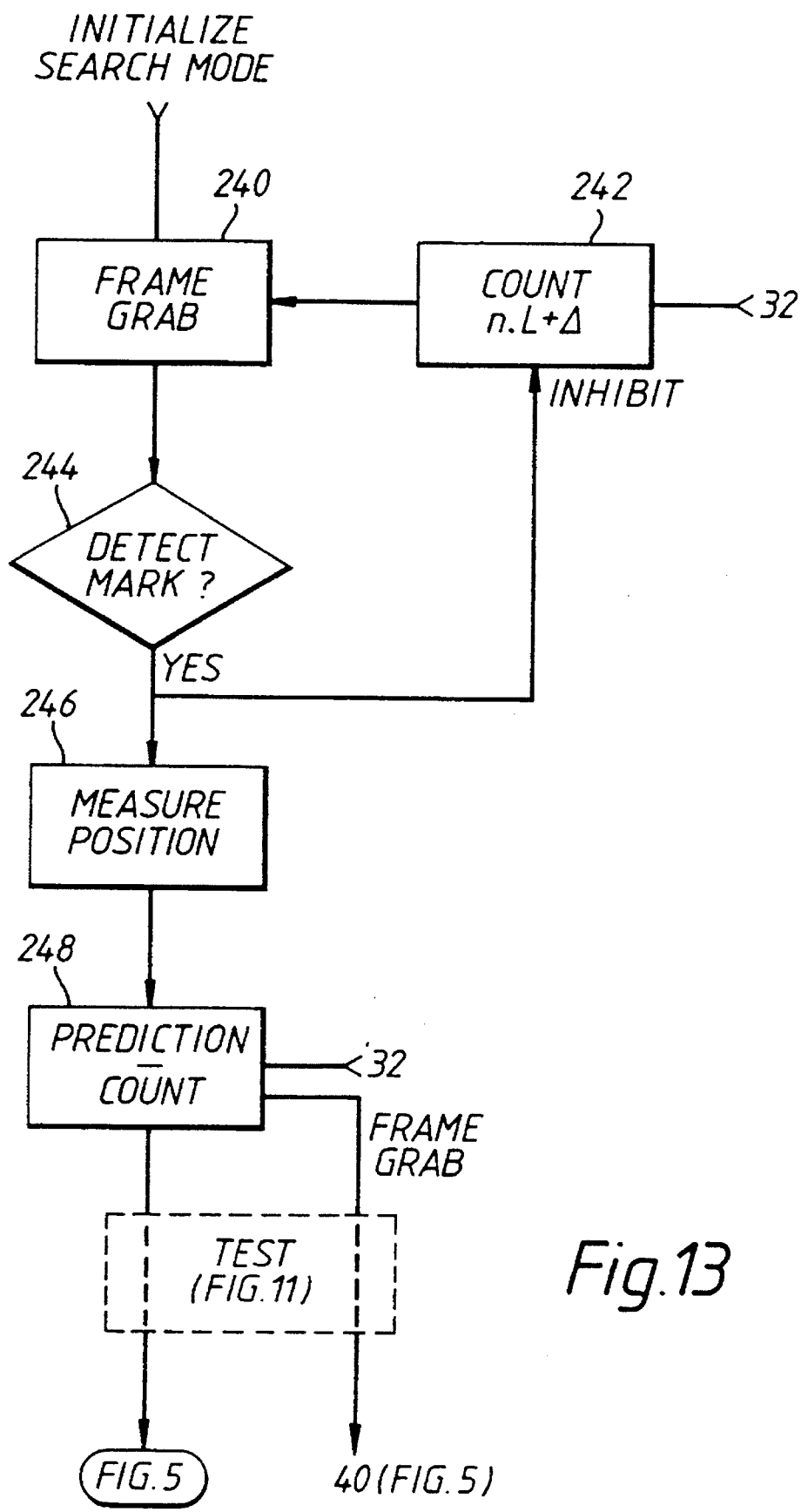
Figure 16:
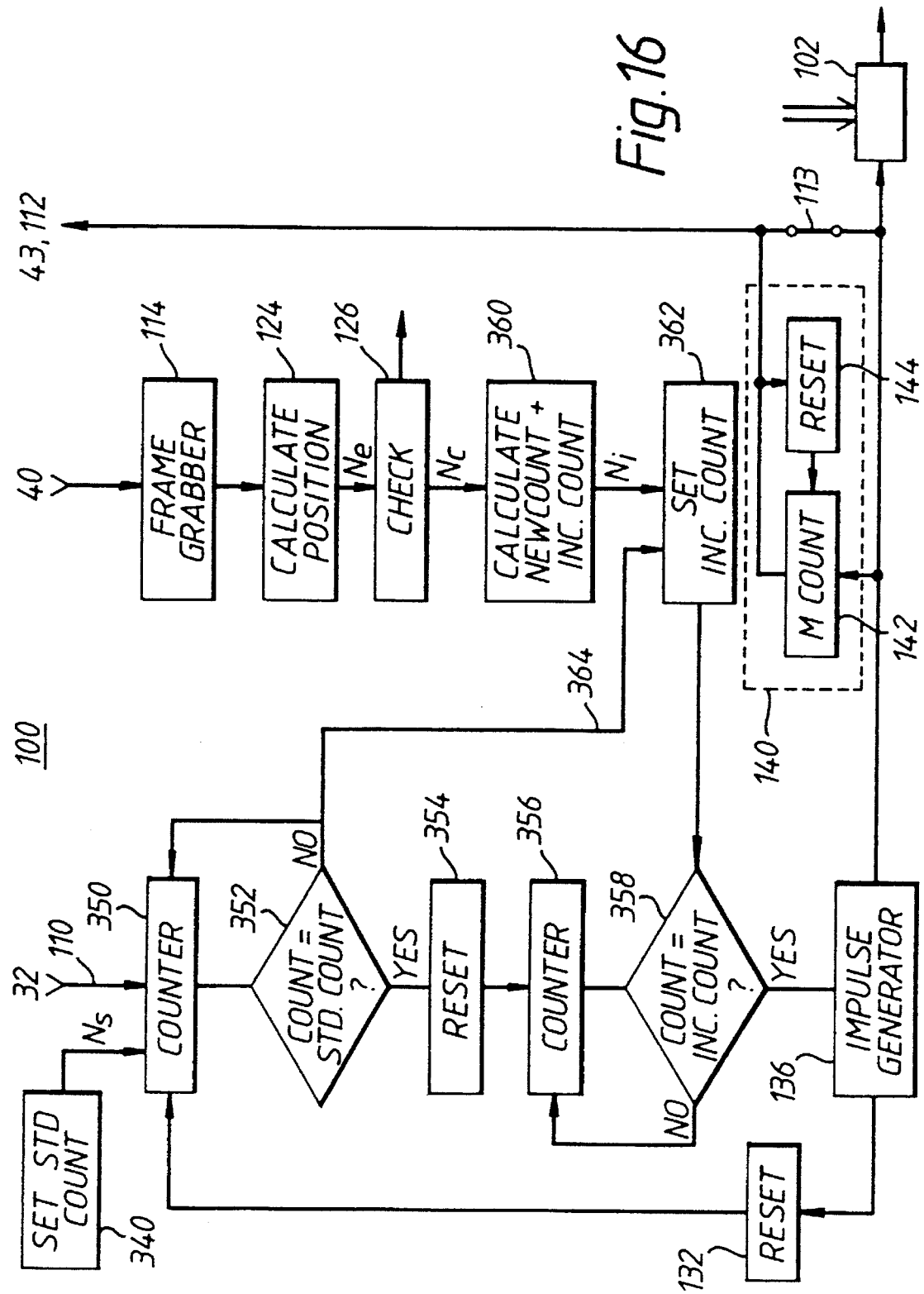

FIGS. 9a) to 9d) are graphic illustrations of the numerical results of processing steps performed in the routine of FIG. 8;

FIG. 10 is an illustration of RA2 size sheets in a web to which a modified start-up routine is applied; and FIG. 11 is a flow diagram illustrating steps in the start-up routine modified for detection and correct acquisition of watermarks in RA2 size sheets;

FIG. 12 shows the basis of an alternative procedure for acquiring watermarks on start-up, FIGS. 12a–12d showing successive steps leading to watermark acquisition;

FIG. 13 is a flow diagram a start-up procedure based on FIG. 12;

FIG. 14 shows in FIGS. 14a) and 14b) respectively side and plan views of an LED array for use as a strobed illumination source;

FIG. 15 is a block diagram of the control and drive circuitry for the LED array of FIG. 14; and FIG. 16 shows a modification of the control loop 100 of FIG. 5.

In later discussion of the more detailed implementation of the headings of this invention, webs watermarked with a combination of the word "Conqueror" and a "Gateway" device are used by way of example. Both of these watermarks are Registered Trade Marks of The Wiggins Teape Group Limited.

The system to be described initially is intended for use in cutting A4 size sheets directly from the web. The adaptation of the system for other cut sheet sizes will be discussed subsequently and will be particularly exemplified by the RA2 standard mentioned above.

Figure 1A:
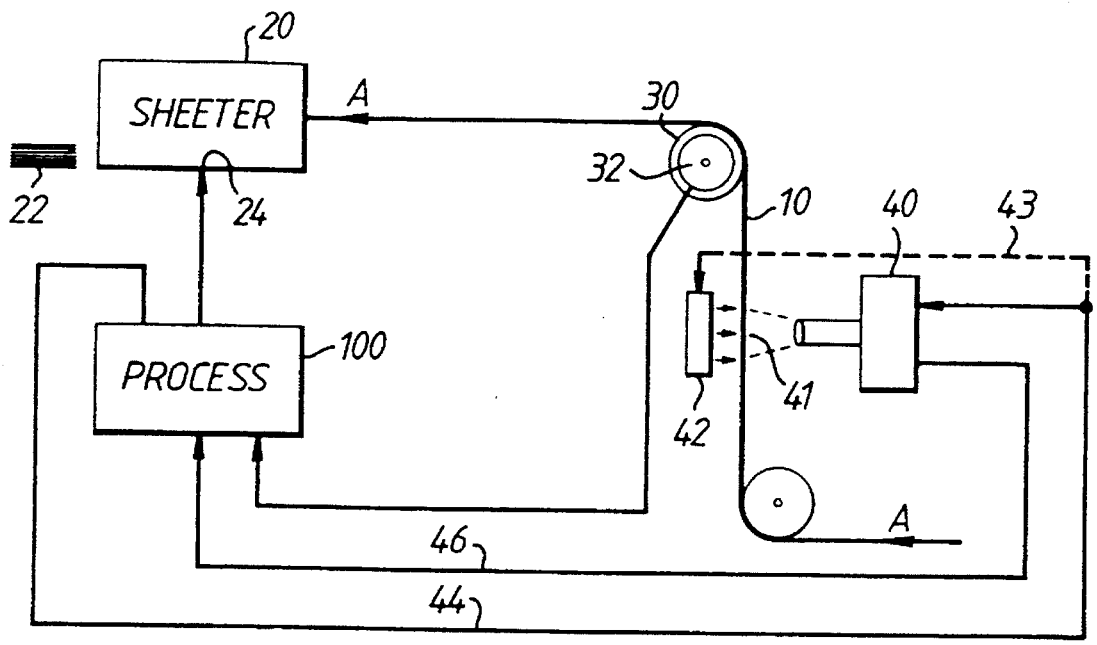
FIG. 1A shows in a side view elements of the system as mounted in the web path preceding a flying knife.
Figure 1B:
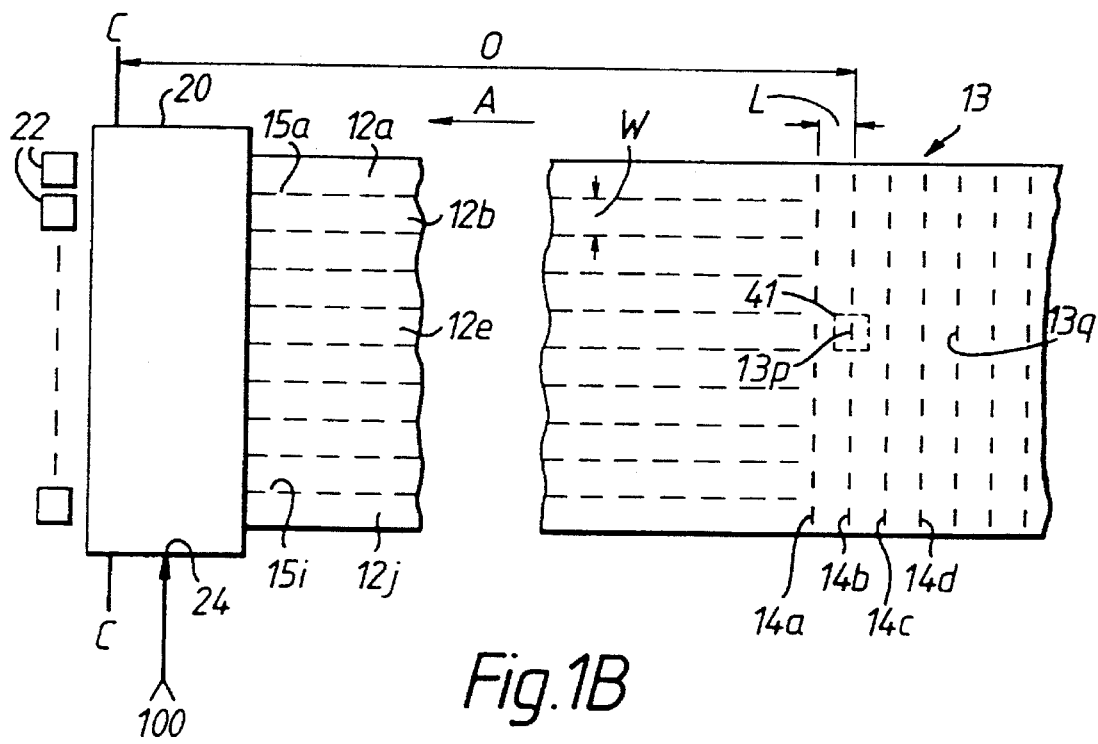
FIG. 1B shows in a simplified plan view the positioning of the camera of FIG. 1A in relation to the watermarks.

Referring to FIGS. 1A and 1B, a web 10 drawn from a reel (not shown) of watermarked paper is running in the direction of arrow A to a sheeting machine 20 including longitudinal slitters and a transverse flying knife. Stacks 22 of individually watermarked cut sheets—A4 size following the example chosen—are produced by the sheeting machine. The sheeting machine 20 is entirely conventional in its construction and operation. It includes an input 24 for receiving electrical pulses by which the operation of the flying knife is synchronised to detection of watermarks on the web. This detection is performed upstream of the sheeting machine 20. The synchronizing pulses to input 24 have been generated in a conventional practice from the detection of index watermarks placed along an edge margin of the web as discussed above.

The system embodying the present invention also generates the synchronizing pulses for input 24 but does so from a camera looking directly at the sheet watermarks on the web, Referring to FIG. 1B, the web 10 has been made for the production of an A4 cut sheet size having one watermark per sheet. To this end the web has watermarks spaced regularly along and across it. By way of illustration some of the watermarks are shown in a block 13. There are ten lines 12a–12j of watermarks extending lengthwise of the sheet at a regular spacing or pitch L, which is nominally 297 mm in the case of A4 size. The watermarks 13—which are represented by short dashes for simplicity—are aligned in rows laterally across the web, e.g. 14a, 14b, 14c, 14d so that the detection of watermarks at an area 41 in one lengthwise series, such as 12e, indexes the marks in the other series. The web is shown as being just ten sheets in width. The web has no additional edge margin in the illustrated case. No edge margin is needed for detection to control the sheeter 20. If it is present, it is removed for re-pulping. When the web enters the sheeting machine 20 it is slit continuously along axes 15a–15i spaced at the paper width W, i.e. 210 mm for A4. The flying knife acts cross-wise along axis C—C to produce the individual A4 cut sheets in stacks 22, each sheet bearing a watermark.

FIG. 1A shows system elements mounted along the web path to detect the watermark positions on the web 10. The web is guided along its path over a free running encoder roller 30 which is driven by the web to provide a pulse output from an encoder 32 rotating with the roller. The encoder 32 generates pulses at the rate of 10 pulses per mm. of web run. Mounted above the web 10 in alignment with the line 12e of watermarks is a camera 40 which captures a frame of video information for each watermark, or preferably for every Mth watermark, in the sequence 12e, where M is the number of rows of watermark dies on the dandy roll which acted on the web in its manufacturing stage. The camera is preferably mounted to view the area 41 (FIG. 1B). The camera is operated with a fast shutter speed so as to freeze an image of web within area 41 on each activation of the camera. However, in practice it has been found that some blurring of the captured image may be acceptable providing the effect of the blurring is consistent over a series of watermark detections. The acceptance of some blurring or loss of resolution may be acceptable in that it allows an easily available and relatively cheap CCD video camera to be used. If better resolution is required the presently preferred solution is to combine such a camera with a strobed illumination arrangement as will be discussed below. For the present, the description of the camera operation will be given on the basis that the image freezing is performed by the camera shutter alone. This operation of the camera together with its associated electronics to read out the captured video is referred to as frame grabbing. In the embodiment to be described, the frame grabbing is taken to be complete when the captured image is stored in memory in numerical form. The selection of the area 41 viewed by the camera is discussed below with reference to a specific example. In normal running, it is generally desirable to keep the viewed area small for good resolution. The measurement loop to be described with reference to FIG. 5 ensures that the watermark falls nominally at a reference position within that area in the lengthwise or machine direction. The processing of the numerical data obtained from a captured image to detect the watermark and measure its position may be restricted to a selected portion of the total area viewed as will be described in the example discussed later with reference to FIGS. 8 and 9. This requires also a location of the area 41 with respect to the transverse position of the watermarks, i.e. the longitudinal series 13p, 13q etc. To this end the camera 40 is mounted (by means not shown) to be adjustably movable transversely of the web to enable it to be aligned with the watermarks on the web. This may be done manually by an operative.

The video information from camera 40 is processed together with the pulses from encoder 32 by processing system 100 which generates the synchronizing pulses to the input of cutting machine. The processing system 100 sends activation signals on line 44 to the camera at calculated intervals to grab a video frame in response to which the camera provides the instant snapshot of the web in area 41. The video information is sent over line 46. If the system is operating properly a watermark will be located within each video frame. The web 10 is back illuminated over area 41 viewed by the camera by means of a light source 42. The light source provides a diffused, uniform illumination of the area 41 to enhance the viewing of the watermark which appears as a lighter mark against a darker background. The dashed line connection 43 from the line 44 to source 42 is not used with a continuous light source but has application to a modification in which a strobed illumination source is employed. This is described later.

Before describing the processing of the video information in greater detail, an explanation will be given as to why it is preferred, though not essential, to look at each Mth watermark where the web fed to the sheeting machine has been watermarked by a dandy roll carrying M-rows of watermark designs.

There are three practical reasons for looking at each Mth watermark. One is that for an M-row dandy roll, each Mth watermark in a lengthwise series will have been made by the same metallic design carried by the dandy roll and thus like is being compared with like. This recognises both variations in the designs as initially affixed to the dandy roll and the fact that they may differentially wear in use. A second is that the pitch or interval between marks made by the same watermark design should give the greatest assurance of consistency of measurement.

The third practical reason is that looking at every Mth watermark gives additional processing time for the video image captured from each watermark. Substantial processing needs to be done. At the rate of 17 A4 sheets per second, a processing time of say 50 mS is required if each successive watermark is captured (M=1). This is greatly eased if every third or fourth watermark is captured. Typically the number of rows of watermarks on a dandy roll is three or four. Easing of the processing speed requirements reduces the computational speed and cost.

Where every Mth watermark is captured, pulses to input 24 of the sheeting machine 20 for the intervening sheets are provided by interpolation. In operating the sheeting machine, it is assumed that the watermarking of the web in its production on the paper machine has been well-controlled. Variations in lengthwise pitch will drift rather slowly in one direction or the other. This assumption applies equally to the prior marginal watermark detection procedure as to that now proposed. For present purposes, it is the detection of the position of the sheet watermarks which is of primary importance, not the control of the sheeting machine 20.

Figure 2:
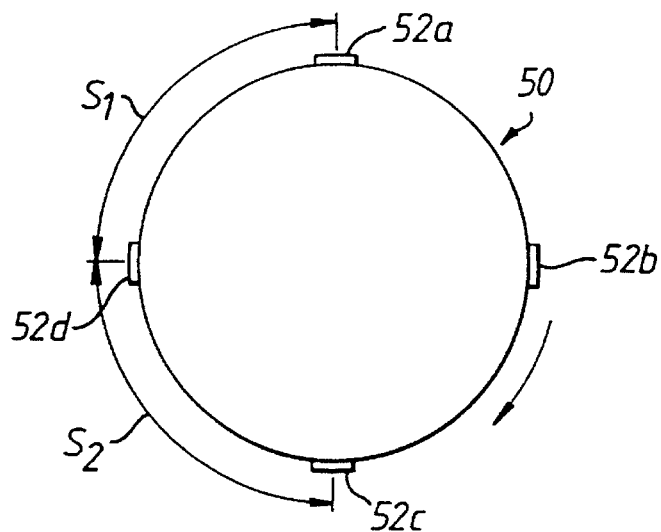
FIG. 2 shows a simplified cross-section of a dandy roll carrying watermark designs.

To further explain the first two reasons given above for looking at every Mth watermark attention will be given to FIG. 2 which is a diagrammatic section through a four-up dandy roll 50 (that is M=4). Watermarks are formed by metallic watermark designs carried by the dandy roll 50. The dandy roll acts on the wet web forming on the Foudrinier wire, to locally redistribute the fibres to give an area of slightly lower substance so that the mark appears as a lighter area in the paper when viewed in transmitted light. The designs of the mark are provided in rows 52a, 52b, 52c, 52d across the dandy roll, the number of designs in each row corresponding to the number of sheet widths. Three, four or more such rows are carried spaced around the circumference of the roll. For paper intended to be directly cut to A4 size, the rows are uniformly spaced. In the four-up case shown, successive rows of-watermarks 14a–d in FIG. 1B are produced by the rows 52a–d respectively. Taking the general case of a dandy roll carrying M such rows, the same design provides every Mth watermark in a longitudinal sequence. Thus, if M is four, then on the web of FIG. 1B, the same design that made watermark 13p will make the fourth following mark 13q and will repeat any individual idiosyncrasies of that design. The dandy roll is formed by a cage of axially-extending bars to which the designs are fixed. There may be small variations in the circumferential spacing between rows, for example $S_1$, $S_2$ whereas the total circumferential distance from a given design back to itself is constant. Consequently there is an advantage in measuring watermark pitch to actually measure the distance M.L between marks made by the same design. The positions of the intervening marks can be interpolated as uniformly spaced.

It should also be noted that, when a cage type of dandy roll is used, the bars of the cage tend to give a laid effect in the paper. This is itself a form of watermarking. The watermark detection system must therefore be capable of distinguishing the wanted mark from any other marks carried by the web.

Watermarking can also be performed by an intaglio form of dandy roll from which the area of the watermark is of slightly higher substance than the surrounding paper and is more opaque when viewed in transmitted light. The detection technique now proposed can be applied to both forms of watermarking but the following description assumes that the more usual lower substance watermarks are present.

The processing system 100 to be described has two phases of operation. There is the normal running phase when the web is moving at near constant speed and the system has locked into the sequence such that the next instance of detection can be predicted from the last within narrow limits. The other phase is the start-up phase when the web is running up to speed and the initial watermark detection is to be made without any a priori knowledge of watermark position. The steady running phase will be first described. It will be assumed that every Mth watermark is detected in the series 12e in FIG. 1B, where M=4.

It is an important characteristic of the preferred embodiment of the invention that the system generates its own clock pulses for timing various operations and functions within the system: more particularly the clock pulse source is the encoder 32 so that the clock pulses are in reality representative of the length of web run over encoder roll 30 in increments of one tenth of a millimeter of web.

Figure 3:
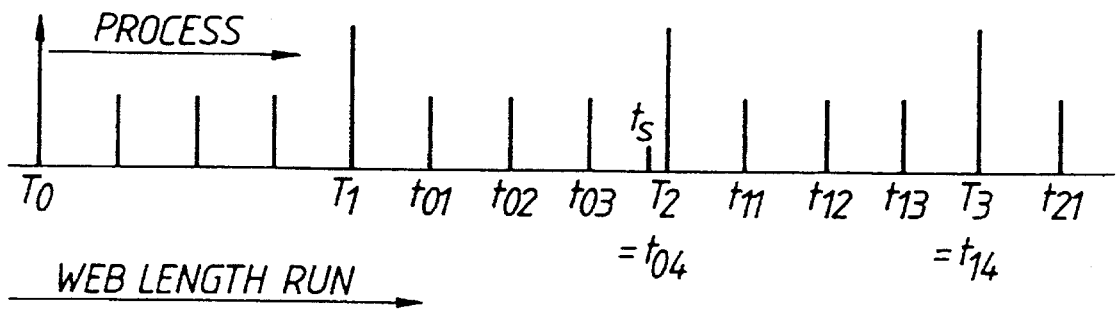
FIG. 3 is a diagram showing timing relationships in the operation of the system of FIG. 1A.

Referring to FIG. 3 the base timing reference for operation is each instance $T_o$, $T_1$, $T_2$ at which the camera 40 is activated. The camera grabs a virtually instantaneous frame. That is, its exposure time is so short, about 0.1 mS, that it freezes motion of the web in its field of view 41 at the time of exposure. By a technique to be described, the longitudinal position of the watermark in that frame is compared to a predicted position and the error in that comparison used to develop a new prediction. The calculations required are relatively time consuming. As indicated by the arrow labelled PROCESS, these calculations may extend over a number of sheet lengths passing the camera providing they are completed before $T_1$. Thus a new prediction made upon the frame grabbed at $T_o$ is not effective until the next frame grab at $T_1$ and predicts the instant $T_2$ at which the next succeeding camera exposure should be made to centre the watermark in the frame. The interval between $T_1$ and $T_2$ is divided into M (=4) equal parts and synchronizing pulses to the sheeter input 24 are delivered at times $t_{o1}$, $t_{o2}$, $t_{o3}$ and $t_{o4}$, the latter providing the next camera activating pulse $T_2$. These synchronized pulse times are dependent on the error detected from the $T_o$ exposure. The next interval $T_2$–$T_3$ provides pulses $t_{11}$, $t_{12}$, $t_{13}$ and $t_{14}$ (=$T_3$) at intervals calculated from the error detected at the $T_1$ frame grab and entered at $T_2$.

Because the "clock" for timing the generation of the synchronizing pulses and the activation of the camera is not a real time clock but is the encoder 32, the interval between camera activation times $T_o$, $T_1$, $T_2$ and so forth is in fact the predicted length of M(=4) sheets to be cut from the web based on the current measurement of sheet length as represented by the distance (pitch) between successive watermark images captured by the camera 40. Thus the system operation is related to and controlled by the watermark pitch. This manner of operation has the advantage that web speed is not a factor in the calculations to be made.

It is also to be understood that because the flying knife is located some way down stream of the camera position, a pulse such as $t_{12}$ generated on a measurement made at $T_1$ controls the cutting of a part of the web that had passed the camera position at an earlier time. As indicated in FIG. 1B, there is an offset O between the cutting axis C—C and the area 41 viewed by the camera. The encoder pulses can also be used to adjust the timing of the synchronizing pulses to the sheeting machine so that it cuts the web at a position between watermarks and such that the latter appear at the desired position on each cut sheet. This is not a part of the detection/position measuring system described. The correct operation of the sheeting machine over a long period depends on the accuracy with which the watermark pitch is maintained in the paper production process.

The operation of the detection and measuring system will now be described in greater detail. The procedure adopted falls into three main parts:

Image capture, digitizing the image, and storing same as a numerical array at which point the frame grabbing is considered completed;

Processing of the numerical data to detect a watermark and determine its position;

Generation of the synchronizing pulses in dependence upon the detected position;

The procedure is shown in outline in FIG. 5. The stages illustrated in FIG. 5 represent a mix of hardware components and logic functions to be performed. For simplicity of initial explanation, the procedure is that appropriate to capturing and processing each successive watermark image (M=1). The modification for and acting on each Mth mark is enclosed within dashed lines 140 in FIG. 5 and will be described subsequently. The figure shows a combination of hardware and logic functions that are performed within the system 100 shown within the broken line of FIG. 5. It will be appreciated that the functions involved in completing the frame grabbing stage may be divided in any way convenient between the camera 40 and the main processing system 100 depending on equipment available. However, the final numerical array resides in memory forming part of the main processor 100. The figure shows the web 10 running over the web-driven encoder roll 30 whose encoder 32 produces on line 110 the incremental length run pulses (each tenth of a millimeter) that act as clock pulses for the system 100. The camera 40 is mounted in line with one of the series of watermarks along the web, for example the series 12e of FIG. 1B. The camera employs a charge coupled device (CCD), for example the charge coupled device may be a matrix array of detector cells whose size is 512 cells (in the lengthwise direction) by 512 cells (in the transverse direction). Arrays of this size are available in current technology. The cell array is exposed to the web by a camera activation pulse (frame grab pulse) applied on line 112. The timing of this pulse is controlled to ensure the frame area includes the next watermark due to be detected. The camera may be activated by frame grab pulses generated other than in the normal running routine of FIG. 5, for example by the start-up procedure of FIG. 7. The camera 40 also has an input on line 48 that switches it between a narrow angle mode and a wide angle mode of operation which is used in the start-up process described below. For normal running the camera is in its narrow angle mode. To simplify both the camera structure and to avoid the necessity to switch between modes, an alternative software control is discussed later.

An advantage of a CCD camera is that while exposure is virtually instantaneous to freeze the web motion, the image is retained and the array can then be read out at a relatively slow rate.

In practice, it is convenient to use a conventional CCD camera in which the image stored on the CCD array is converted to a normal analogue video signal format; This video signal is then digitized by known sampling techniques and the resulting numerical values stored as a matrix array in computer memory. One consequence of this conversion procedure through the intermediary of a television signal is that there is not a one-to-one relationship between the numbers stored in the matrix array in memory and the light levels recorded on the cells of the charge coupled device even if the matrix array is the same size as the CCD cell array. That is to say, there is not a one-to-equivalence between memory addresses and the CCD cells. However, the numerical matrix array will be a digital version of the same image as that captured on the CCD array and rows and columns (the lengthwise web direction and transverse direction respectively) within the numerical array can be scaled to actual distances on the web. The significance of this will become clearer when the detection procedure is more fully described below. The present practice is to establish the scaling for the particular installation, such as that of FIG. 1A, by locating a known size marking, object or scale at the web surface and detecting it to determine its position within the numerical array. A scale factor for the installation is then stored for use in subsequent measurement.

An alternative would be to have an arrangement in which the cells of the CCD array are digitized individually to provide a numerical array with a one-for-one correspondence. However, the technology currently available makes it move convenient to use a readily available video camera employing a CCD array sensor. Whichever arrangement is used, each number in the memory matrix array represents one pixel of the image seen by the camera. If the numerical matrix array is a 512×512 array there are 262144 (256K in computer usage) pixels. The analogue image intensity at each pixel is digitised and represented as an 8-bit word.

Figures 4A, 4B, 4C:
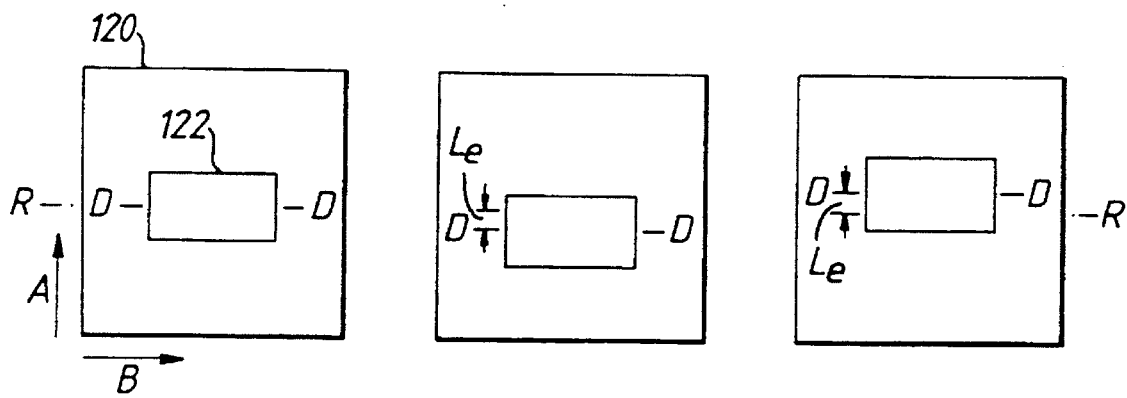
FIGS. 4a–4c are simplified explanatory diagrams showing the capture of a sheet watermark in the frame of a video camera exposure.

The processing of the array of numbers obtained at block 114 is to detect and determine the position of the watermark within the frame seen by the camera. The general principle may be better understood by reference to FIGS. 4a to 4c. Each figure shows the frame area 120 viewed by the camera 40 and corresponds to the field of view 41 in the more general description given above. However as will be described, the amount of the viewed frame actually processed can be adjusted to different operating conditions. Arrows A and B indicate the orientation of the frames, with A being the lengthwise or machine direction and B the transverse or cross-machine direction. The frame defines a transverse reference axis R—R that provides the base against which to measure watermark position. In operation R—R becomes the predicted position axis as will appear in the following description. The detected watermark in each frame 120 is diagrammatically represented by a box 122. The box is moving in the direction of arrow A and each frame shows the position of box 122 in the frame as its image is frozen at the moment of exposure of the camera, such as $T_1$, $T_2$ etc. Assume for the moment that the detection criteria for recognition of the watermark are such that a recognition signal exists at a transverse axis D—D across the box. The establishment of appropriate criteria is discussed later. The axis D—D defines the position of the watermark relative to the reference axis R—R. FIG. 4a shows a case where the axes D—D and R—R are coincident, that is the watermark is exactly where predicted. FIGS. 4b and 4c show cases where the watermark is behind and ahead of the predicted position respectively. They also illustrate the box to be transversely offset to one side and on the other. Employing certain detection procedures involving image matching discussed below, a degree of lateral offset is within the tolerance of the matching procedure. We have preferred to adopt a more straight-forward numerical averaging technique as will be described. The tolerance of this technique to lateral offset may well depend on the specific mark to which it is applied and on parameters set with respect to that mark. For the embodiment given by way of example in this description, alignment of the camera 40 with the line of marks being detected is preferred. The lateral adjustment of the camera 40 for this purpose has already been discussed.

There is an error offset $L_e$ between axis D—D and R—R which can be defined in terms of the image as stored in the numerical array. The known optical scaling of the numerical array allows the error Le to be equated with an actual physical distance on the web. This distance can be expressed as a number of pulses from encoder 32. Therefore, if the detection of the watermark can be established at a certain row of the numerical array, this can be translated to a true physical offset $L_e$ on web. $L_e$ is representable by a number $N_e$, where $N_e$ is $L_e$ expressed in tenths of a millimeter, that is a count value obtainable from encoder 32.

In FIG. 5, block 124 indicates the conversion of the numerical array obtained at block 114 to an error position Ne of the detected watermark between its actual and predicted positions, the error being expressed in terms of pulses from encoder 32.

Having obtained the error value $N_e$, it is checked at step 126 to see if it lies within allowable tolerances. It will be recalled that there is an underlying assumption that changes in watermark pitch will occur relatively slowly, drifting one way or the other. Thus successive detections should not produce major errors $N_e$. Other checks are made at step 126 as is further discussed below. Assuming the error is within acceptable limits it is divided by 4 to obtain a correction value $N_c$. It will be recalled that error is measured over M watermarks. However, for reasons which will become clear, the predicted watermark spacing is not stored as the M sheet length such as $T_1$–$T_2$ in FIG. 3 but as the single sheet length. Thus the appropriate correction is given by $N_c=N_e/M$, which is $N_e/4$ where M=4. It is to be understood that the correction carries the appropriate sign, for example positive in the case of early detection as in FIG. 4b, negative for late detection in FIG. 4c.

The predicted value of the watermark spacing, i.e. a single sheet length L, is stored at step 128 (e.g. in a register). After processing the data from an exposure say $T_o$ in FIG. 3, the correction $N_c$ is added to the existing value to obtain a value NEWCOUNT that is the up-dated prediction for the sheet intervals $t_{o1}$, $t_{o2}$ etc. from $T_1$ to $T_2$. The NEWCOUNT value will have started from an initial parameter value representing the ideal sheet length. For an A4 length of 297 mm, NEWCOUNT is initially set to 2970.

In order to explain the generation of the synchronizing pulses to the sheeter input 24, consider first the case in which every watermark in a series is detected (M=1) and gives rise to an up-dated NEWCOUNT value for predicting the position of the next but one watermark. In the terms of FIG. 3, $T_o$, $T_1$, $T_2$ and so on now represent the synchronizing pulses generated on a sheet-by-sheet basis. There are no intervening sheets or interpolation at $t_{o1}$, $t_{o2}$ and so forth. The error resulting from the $T_o$ frame grab is entered to give an up-dated NEWCOUNT value at $T_1$ which predicts the watermark position at $T_2$. For this sheet-by-sheet explanation the portion of FIG. 5 enclosed in dashed lines 40 will be ignored for the time being. In this case the error value $N_e$ pertains to one watermark pitch and thus for up-dating the NEWCOUNT value, $N_c=N_e$. Each synchronizing pulse generated is applied to the camera 40 through connecting link 113 to the line 112.

In FIG. 5, the pulses from encoder 32 are counted by a counter 130 which is re-set as indicated at 132 upon each generation of a synchronizing pulse. The instantaneous value (COUNT) in counter 130 is compared at 134 with the value NEWCOUNT held in register 128: when COUNT= NEWCOUNT, a synchronizing pulse is generated at block 136. This pulse is sent to the input 24 of the sheeting machine 20, it provides the next frame grabbing pulse on line 112 resets the counter 130 to zero, and causes the NEWCOUNT value to be up-dated by the correction $N_c$ obtained from the last frame grabbing pulse.

This cycle repeats for each watermark detected. The NEWCOUNT value will track the real value of the watermark pitch. This is an important feature of the system being described. The watermark pitch is measured, this value is used as a prediction of the next or next but one watermark position, and the frame grab pulse issued accordingly. The error between the predicted and measured position is then used to correct the pitch value and so on.

Returning to step 126 in FIG. 5, if the error $N_e$ is excessive, it may be ignored for up-dating purposes. It may be indicative of a false detection. Bearing in mind that errors are expected to be small from sheet to sheet, the existing NEWCOUNT value may be retained in these circumstances in the expectation that the next detected watermark position will be good and the up-dating of register 128 can be done.

The step 126 may also include provision for providing of error values $N_e$ is too great—for example the detection an ERROR signal output 127 if the magnitude of a succession apparatus has become faulty, the watermarks themselves are of poor quality—or if the NEWCOUNT value has passed an upper or lower limit indicative of an unacceptable spacing of the watermarks that will not enable sheet length to be maintained with an acceptable placement of the watermark on the sheet. Preferably with high quality bond stationery, the watermark should remain within the middle third of the sheet. How the signalling of an ERROR 127 is utilised depends on the manufacturing standards set. This lies outside the purview of the watermark position detection apparatus under discussion.

It will be appreciated that what has been described thus far is the processing of the captured video image within an interval of 1 sheet (say less than 50 mS) from the frame grab pulse. This is still difficult to do at moderate cost with current technology. The operating cycle described with reference to FIG. 5 provides the facility of generating a sheeter synchronizing pulse for each sheet independently of the conditions chosen to up-date the NEWCOUNT value. The FIG. 5 cycle can thus be adapted to meet the preferred operation discussed above in which every Mth watermark image is captured and the generating of pulses in between is done by interpolation. The MCOUNT is also used to control the application of frame grab pulses to the camera 40 so that only each Mth pulse from generator 136 results in an activation pulse to the camera. This is indicated at stage 140.

Reverting to the procedure already discussed of updating every Mth watermark, and specifically every fourth watermark as described with reference to FIGS. 2 and 3, the additional steps enclosed within the dashed line 140 of FIG. 5 show a modification of the operating cycle so far described.

In the modification, the direct transmission of all synchronizing pulses from generator 136 to the camera as frame grab pulses is discontinued, i.e. the link connection at 113 is broken. Frame grab pulses now depend on the operation of a further counter 142 which counts the synchronizing pulses and is reset every M(=4) such pulses. The up-dating of NEWCOUNT in step 128 is only entered if MCOUNT in counter 142 is at "4". At the same time as the up-dating of a reset 144 is applied to counter 142 and the same pulse provides the next frame grab pulse on line 112. The effect of these additional stages may be best seen in conjunction with FIG. 3 applied to the detection of every fourth watermark image. The captured video image from a synchronizing pulse at $T_1$ is processable over an interval up to 4 sheet lengths, as indicated by the $t_{o1}$, $t_{o2}$, $t_{o3}$, $t_{o4}$ at each of which a synchronising pulse is sent to the input 24 of the sheeting machine. The generation of the synchronizing pulses is as explained above using the NEWCOUNT value established at $T_1$ as a result of the video image captured at $T_o$. The MCOUNT value is reset to zero at $T_1$ so that the up-dating of NEWCOUNT is inhibited through $t_{o1}$, $t_{o2}$, $t_{o3}$ until M=4 when the $t_{o4}$ synchronizing pulse is sent to sheeter input 24. At this moment the next frame grab pulse $T_2$ is applied to camera 40. Counter 142 is reset to zero to commence counting the next set of synchronizing pulses $t_{11}$, $t_{12}$, $t_{13}$, $t_{14}$ generated in dependence upon the updated NEWCOUNT value established at $T_2$.

Thus a synchronizing pulse to the sheeter 20 is generated for every sheet to be cut but the watermark position measurement and synchronizing pulse timing is updated only on every fourth sheet. This arrangement can be readily adapted to any number as required. The interpolation of the synchronizing pulses on the intervening sheets is also justified because any drifts in watermark spacing over a few sheets should be small. It is to be understood that transmission of the synchronising pulses to the input 24 of the sheeting machine will be done through a control gate 102 arranged to allow such pulses to be transmitted only when all the necessary conditions for correct cutting of the web are met.

The foregoing description is concerned with the main system process in normal running. Attention will now be given to the start-up procedure from which a transfer is made to the normal operation described with reference to FIG. 5. As will become clear the start-up procedure employs position measurement techniques modelled on those already described and uses the encoder 32 as the "clock" source.

The basis for the initial capture of a watermark is to look at a larger area of the web than is done in normal operation. This may be implemented in a number of ways. One uses an additional camera, others use the existing camera 40 but temporarily employ a wider field of view. A practical compromise for ease of installation and avoidance of mechanical switching is the software controlled arrangement described below.

Figure 6:
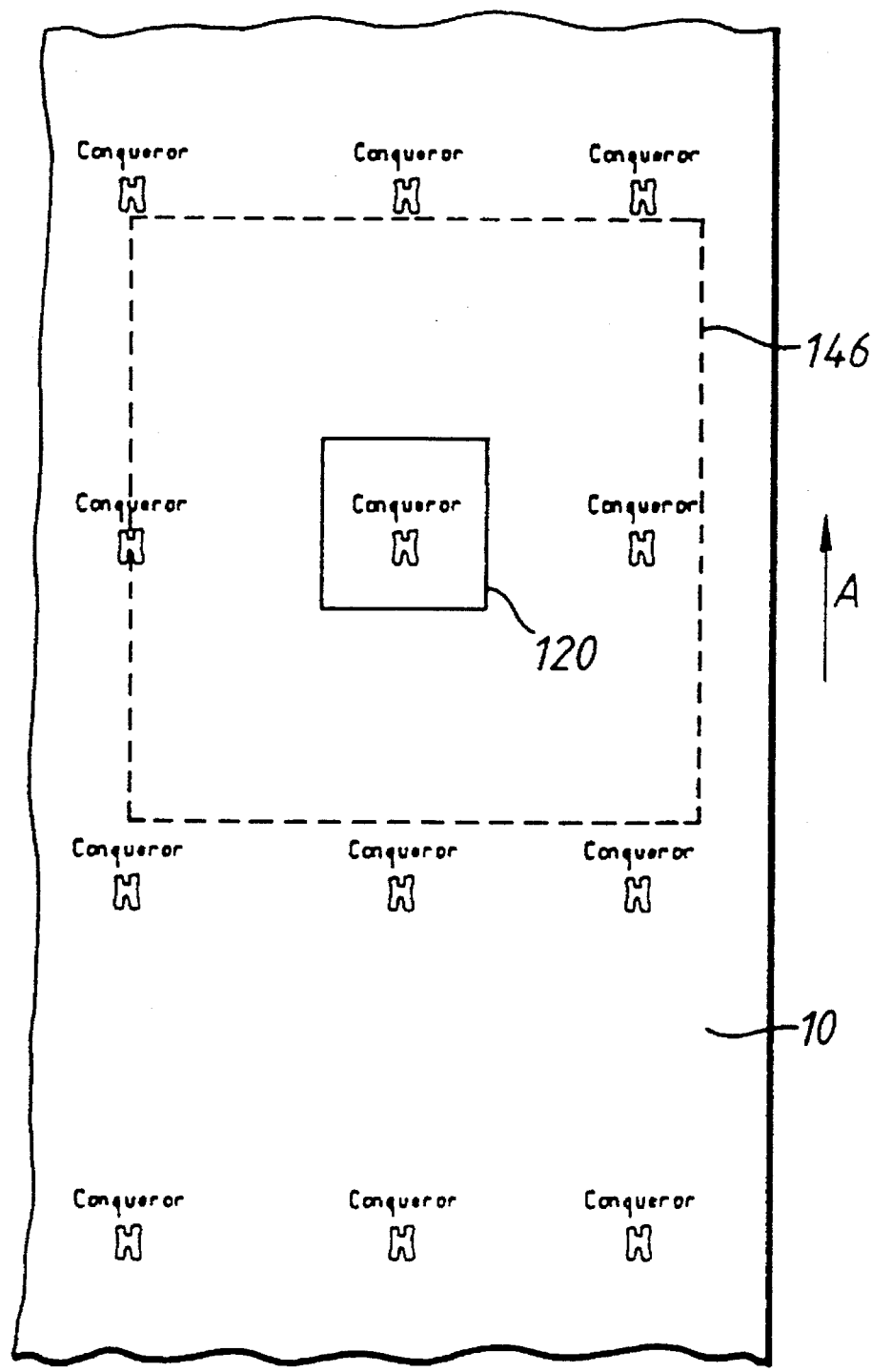
FIG. 6 shows the optical fields of view employed in normal running and start-up operation superimposed upon a portion of a watermarked web.

For resolution and accuracy of determination of watermark position in normal running as discussed above, it is preferred to restrict the camera field of view to the local area where the watermark is predicted to be. The area may be further restricted during video processing. The general principal is illustrated in FIG. 6. The figure shows a portion of paper web 10 moving in the direction of arrow A and bearing watermarks a regular intervals longitudinally and transversely as already discussed with reference to the block of watermarks 13 in FIG. 1B. By way of illustration the watermark is the word/symbol combination of the word "Conqueror" surmounting the "Gateway" device.

In FIG. 6 the square 120 is the frame area seen by camera 40 during normal running to capture a watermark such as 13p (FIG. 1B). The field of view is kept small to allow best resolution of the watermark 13p whose position has been predicted from the previous frame grab.

In the start-up procedure or in re-establishing normal running after a process interruption, a much wider field of view is employed. This wider field of view, shown on FIG. 6 by dashed line square 146, is to ensure that a watermark is rapidly captured. The field of view is in excess of the watermark pitch in the lengthwise direction, typically about one and one-half times A4 sheet length. An initial prediction can thus be established and control then handed over to the control procedure of FIG. 5. The start-up procedure is illustrated in FIG. 7. For the present it will be assumed that the single camera 40 is used and is switchable between the wide angle of view 146 and the narrower angle field of view 120. FIG. 7 shows in dashed line a TEST step 220 which is not used in the direct cutting of A4 size sheets. It has application to the cutting of RA2 size sheets described later.

At 150 the camera is set to the wide angle by an initialisation input generated on start-up or upon a process interruption. The camera is operated in a free running mode. It will be seen that the wide angle area 146 is such as to ensure a watermark lies within it in the lengthwise direction. The video signal representing the frame area 146 is digitized at step 152, corresponding to step 114 of FIG. 5, to produce an array of numbers which is then subject to appropriate detection and calculation routines at 154 corresponding to the step 124 in FIG. 5. The detection performed at stage 154 can include processing of the number array to determine that it is the desired watermark that has been captured.

The calculation of the lengthwise position of the watermark is with respect to the nominal zero or reference position axis R—R of FIG. 4. What emerges from step 154 is an error value $N_w$ which is expressable in terms of pulses from encoder 32. Because of the wider angle of view at this time, the true resolution of error offset is less than in the normal running use of FIG. 5, but all that is necessary to do in the start-up procedure is to bring the series of watermarks moving past the camera 40 within the narrow angle, frame-grabbing procedure of FIG. 5.

To this end the error value $N_w$ is used in a counter stage 156 to establish a count value (in terms of encoder pulses) predicting the position of the next watermark after that just-detected or the position of a watermark that lies at a set number of watermarks thereafter. This value is counted by counting pulses from encoder 32, in a manner similar to that described with reference to FIG. 5. When the count reaches equality with the count value representing the predicted position a frame grab signal is sent to camera 40 which is now set at step 158 to its narrow angle position by a signal applied on line 48 (FIG. 5). The normal running procedure of FIG. 5 then takes over.

In practice the setting of the camera to its narrow field of view may be initiated before the generation of the frame grab signal at step 156 in order to allow time, in the appropriate case, for mechanical setting or selection of the camera lens. This is discussed below.

A single frame grab with the wide angle lens setting should be sufficient to provide an accurate enough prediction of the position of the next watermark to be detected to enter the FIG. 5 procedure at this stage. It would be possible to have a loop iterating the wide-angle, frame grab at step 152 until some criterion of detected watermark position was met for transfer to the procedure of FIG. 5.

Figure 9:
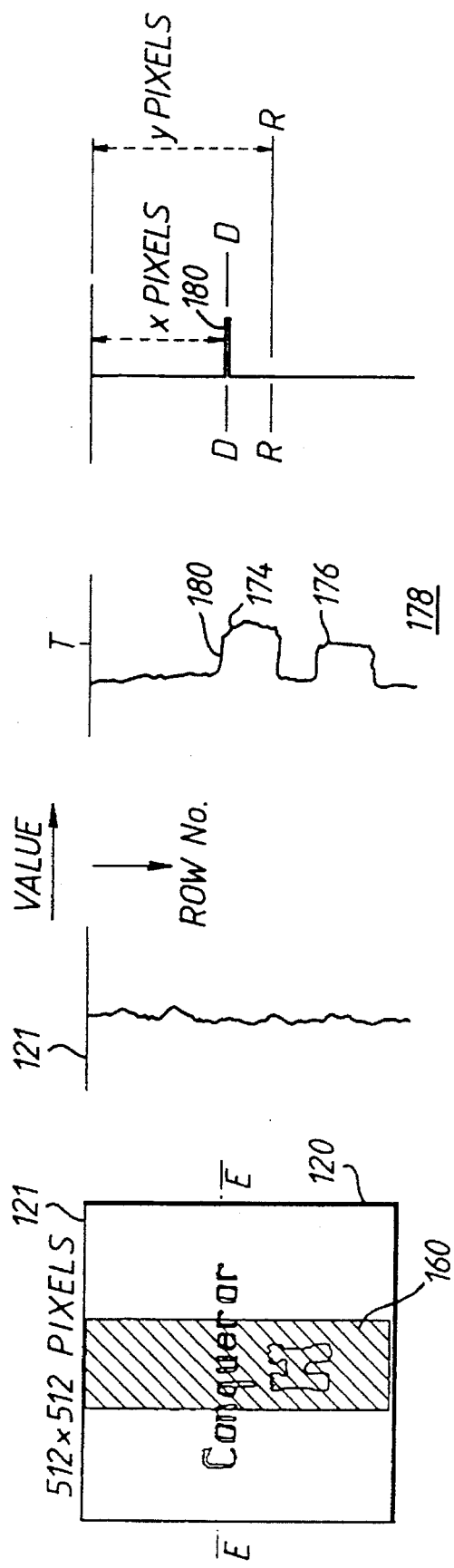

FIG. 6 shows a case where the watermark initially detected is virtually at the reference position. As described with reference to FIG. 4 it may lie above or below that position. Furthermore with wide-angle, image capture of the dimensions indicated, it is very likely that two watermarks in the same line will be captured within the frame 146. Either will serve for detection and measurement to bring the next predicted mark into the narrow angle frame 120. The video processing scheme that is to be described with reference to FIGS. 8 and 9 is such that the procedure operates to detect either the upper or the lower mark of two marks captured in any start-up procedure. Specifically the embodiment described captures the first or upper mark of the two as seen in FIG. 6.

It will also become clear from the later description of video processing that processing can be concentrated on a lengthwise strip including the wanted sequence of marks on which the camera 40 has been aligned. This avoids any concern about other laterally offset marks in adjacent sequences that are captured within the frame 146.

This start-up procedure is greatly facilitated by the use of the length increment pulses from encoder 32 as the "clock" pulses. As already mentioned, they allow the measurement of position to be done without reference to web speed—which is likely to be changing during the start-up procedure.

Where the camera 40 is also used for the wide angle detection, provision is made to switch between wide and narrow angle lens positions for start-up and normal running respectively. The camera may be fitted with switchable discrete lenses or a motorised zoom lens could be used. It is important that the two optical positions each provide a well-defined and repeatable optical scaling over repeated actuation.

An alternative is to use the camera 40 with a fixed lens only for the narrow angle imaging and to provide a separate camera with a fixed wide angle lens. This is mounted in fixed relationship to the camera 40 and closely adjacent to it. In this case, the switching between wide and narrow angles is all done at electrical signal level by switching between the camera outputs.

Yet another alternative is to use a single camera 40 with a single fixed lens and to effectively select wide and narrow angle views at the CCD array level. For example, the CCD cell array could have 2048×2048 pixel elements onto which is imaged the wide field of view 146 in FIG. 6. Having located and determined the position of a watermark within this large array in a procedure corresponding to that of FIG. 7, the frame grab pulses for normal operation are issued and the subsequent watermark detection effected within a central area only of the array corresponding to frame area 120. For example, the normal running detection can be done using the central 512×512 pixels of the cell array providing the same resolution as previously described. It will be appreciated that within the resolution limits set, reducing the number of array pixels which in the numerical array derived from the cell array are subject to video processing, considerably reduces the processing effort and the time required for it.

Closer attention will now be given to the detection of watermarks and the determining of their positions. Image matching or correlation techniques are well established for general usage by which an image to be tested is best-fitted to a reference image. Such techniques may involve considerable computational effort. In the present system it has been preferred to determine some criteria by which the desired watermark may be taken to be recognized and its position measured. It will be well understood that watermarks applied to paper can vary widely and that criteria applied to the detection and location of one specific mark are not necessarily the best for another. Each mark has to be considered with a view to ascertaining features of it which give rise to a numerically detectable characteristic, and more particularly a characteristic which can be well defined as regards determining the lengthwise position of the mark.

It should be mentioned at this point, that the general techniques of image processing have reached a very advanced state Detection of images in "noise" i.e. against a noisy background, enhancement, digital filtering and so forth are all well within the expertise of those skilled in the art.

The procedure that has been developed in this case will be described with reference to FIGS. 8 and 9, FIG. 8 shows the video processing routine and FIG. 9 exemplifies the processing as applied to the combined "Conqueror" and "Gateway" trade marks already discussed. FIG. 8 shows in more detail the broad CALCULATE POSITION step 124, of FIG. 5. FIG. 9a) shows to an enlarged scale the narrow field of view 120 illustrated in FIG. 6 where the watermark combination is captured in normal running. FIGS. 9b) and 9c) illustrate stages in processing of the numerical array leading to a position-determining step in FIG. 9d). In each of FIGS. 9b) and 9c), numerical values are shown horizontally and the row position or number vertically from the top 121 of the frame area 120. The values are discrete values for the 512 rows although the graphs are drawn as continuous functions. FIG. 9d) similarly shows the position output.

In the example taken of the combination watermark, the "Gateway" device plays no part in the position detection procedure. The word "Conqueror" is used and as will be described in this case a simple criterion can be applied to the determination of its position. This is the onset of the top of the middle portion of the word. What is examined is a restricted area 160 of the total frame area 120. The area 160 forms a central longitudinal strip shown shaded in FIG. 9a. This examination is performed on the numerical array resulting from the frame grabbing step 114 which is shown in FIG. 8. It will be recalled that the numerical array is a 521×512 matrix of 8-bit numbers defining a pixel array covering the frame 120 captured in camera 40. Thus the rows and columns of the numerical array can be correlated with physical positions and distances on web in the lengthwise and transverse directions as imaged onto the camera. To ensure that the mark is correctly laterally positioned in the camera frame 120 and, likewise within the numerical array in its digitized form, it is assumed that the camera 40 has been laterally adjusted to align with the series of marks being detected.

It will also be recalled that to enhance contrast between the watermark and the surrounding web, the area 120 is back-lit as shown in FIG. 1A. The back lighting also provides a relatively stable lighting level reducing the effect of ambient light changes, including light scattered from the web surface facing camera 40, and the effect of web flutter.

Having obtained the overall numerical array, FIG. 8 shows at step 162 the selection of that part of the array corresponding to the shaded sub-area 160 of FIG. 9a). Looking at strip 160 from top to bottom the top of the letters of the "Conqueror" mark excluding the "C" lay in a common horizontal line E—E which defines the intended axis at which recognition is signalled. Ideally the axis D—D of FIG. 4 should coincide with axis E—E. Thus at the onset of the letters there is a change in amount of light transmitted by the web. This is further discussed below.

Prior to any processing for position determination, the numerical values of the area 160 as whole can be looked at to determine if they lie within acceptable limits at step 164. This is a general check as to whether a satisfactory image has been captured. If the whole area is too dark, for example due to failure of the light source 42, an error is signalled. If the area is too bright, for example the web has broken allowing the camera to see the light source directly, an error is likewise signalled. Other checks on the range of the numerical array values may also serve to indicate whether the camera shutter speed is set correctly.

Assuming the tests applied in step 164 are satisfactorily met, the array is subject to a contrast adjustment 166 whereby the individual numerical array values are proportionately adjusted (a gain adjustment) such that the values lie between predetermined upper and lower range limits. This is effectively a normalisation process whereby the range of values from the frame grabbing step is scaled to fill a prescribed range. This normalisation assists the implementation of the position detection step performed subsequently.

Having normalised the array, (more accurately, the selected sub-array) it can be then subject to further testing at 168 which can be used to monitor the quality of the mark. The exact nature of this process is not pertinent to an understanding of the position measurement with which we are concerned. Assuming that the required standards are met, the normalized numerical array is then processed to determine the position of the "Conqueror" mark as represented by its numerical equivalent in the array.

To determine the onset of the top of the mark in strip 160, an examination is made of the average intensity of each row of pixels within the sub-array area 160. A summation of the numerical values within each row is a measure of the average intensity. In theory the row averages should be uniform until the onset of the mark and then the average change noticeably for those rows incorporating portions of the watermark letters. In practice, the situation is much more difficult. The wanted information is masked by noise.

FIG. 9b) illustrates the average row intensity on a horizontal axis against row position or number on a vertical axis (conforming to the orientation of FIG. 9a). These values are obtained at step 170 in FIG. 8. The graph of FIG. 9b) is diagrammatic, not actual, and is intended to demonstrate the fact the variations to be detected are small and are obscured in substantial noise. Thus the row averages need further processing and filtering—all done by known computational algorithms—to extract the wanted data from the noise. This further processing is essentially a low pass filtering (LPF) operation performed at step 172.

FIG. 9c) illustrates the filtered and processed average row data from which the wanted information emerges. The intensity curve shows the distinct intensity change at 174 corresponding to those rows incorporating portions of the letters in "Conqueror". In this case the watermarking is assumed to be more light transmissive than the remainder of the sheet. Similarly those rows intersecting the "Gateway" device show a distinct intensity change 176. The filtered row values—512 rows in all—is examined at step 178 in FIG. 8 from the top row downwards with reference to a threshold value T to determine the row at which the threshold is crossed and can be mathematically considered to remain crossed over a number of rows reflecting the depth of the letters. The importance of the normalisation or contrast adjustment carried out at step 166 will be apparent. A single set threshold T is applicable to the filtered data despite variations in the range of the data obtained from successive frame grabbing steps 114.

The position at which the threshold is first crossed relative to the background web values (moving down from the top) of the frame area 120 is indicated at 180 in FIGS. 9c and 9d). Because of the scale correlation between the numerical array rows and the image captured in frame 120, the detected position 180 can be stated to be x pixels from the top of the frame and this can be translated into an actual distance on the web. This position corresponds to the actual axis of recognition D—D in FIGS. 4a)–4c). The position is compared at step 182 with a reference or predicted position at y pixels from the top of the frame corresponding to axis R—R in FIG. 4 to derive an offset value (x–y) translatable into lengthwise distance Le on the web and thus into the equivalent number of length increment pulses Ne from encoder 32. Referring now to FIG. 5 again, it will be recalled that the value Ne obtained at step 124 is used to adjust the NEW-COUNT value predicted sheet length.

The position determining routine described does not require excessive computational power. This aids fast processing. However, other image processing techniques are available as briefly mentioned above and may be preferred for some watermarks confrontations. For example, a digital version of the watermark may be held in memory in the form of a numerical array. A watermark captured from the web, after normalisation, can be compared to the reference. For example, one array is inverted and the two arrays added. The resultant is a measure of overlap from which the captured watermark position can be calculated. Another technique involves effectively shifting the reference with respect to the captured watermark to obtain the best match or correlation. From the matching position, the position of the captured watermark within its frame can be determined.

There has been described thus far, the procedures for capturing a watermark image from the web, digitizing the image and storing it as a numerical array; subsequently processing the numerical data to detect a watermark and determine its position; and the manner in which this positional information is used to establish the position of a subsequent watermark position concurrent with the generation of synchronizing pulses for control of the sheeter. The procedures have been described for A4 sheets cut directly from the web. Mention was made earlier of other sheet sizes to be cut from the web. As mentioned above, the sheeter may cut to a larger sheet size which is cut to A4 subsequently. For example, the larger sheet size may include four A4 size sheets plus a margin or trim. A distinction is drawn between, on the one hand, cutting any size sheet directly, e.g. A3, A4, A5 with no margin—these can all be subject to the process described above with appropriate scaling—and, on the other hand, cutting a larger size sheet from which A4, A5 size sheets are to be later separated and in which the larger size sheet involves allowance for a margin or trim. This leads to the longitudinal watermark pitch being non-uniform and the procedures above described need to be modified to take account of this. These modifications will be described with reference to the cutting of RA2 size sheets.

The system described above is applicable to RA2 sheets with appropriate setting of relevant parameters. This applies to normal running: special measures need to be taken in the start-up procedure. The RA2 sheet length is 610 mm so that the initial NEWCOUNT value set-in FIG. 5 will be 6100. The system could be operated to up-date the NEWCOUNT value for each RA2. In this case the counting loop 140 is not used. However, for the reasons given earlier it is preferred to use an MCOUNT value of 2 in the loop 140. In this case an MCOUNT=2 equates to a value of M=4 as regards the number of watermarks. This will be explained with reference to FIG. 10 which shows the layout of two successive RA2 sheets in the web 10. The dimensional lines are, of course, added only to assist the explanation to be given.

Referring to FIG. 10 this shows two successive RA2 size sheets 190, 192 in line along the web. Each sheet comprises a block of four A4 sheets edge to edge but a trim area 194 is allowed around each block. The trim width is $t$ in the lengthwise direction. It is the same at the top and bottom of each RA2 sheet. It is evident that if the watermark is to be located at the same place on each A4 sheet, then the pitch of two marks within the RA2 size sheet is the nominal A4 length (297 mm), but the pitch between successive marks, such as 196, 198 falling on successive RA2 sheets is the nominal A4 length plus 2 to t is 8 mm so the pitch in this case is 313 mm. The flying knife in the sheeting machine is to cut along transverse lines 200, 202, 204 and so on. If in synchronizing the flying knife, the detected watermark on successive RA2 sheets is upper mark 198 there is an appropriate fixed offset between the mark position and the line of cut. However, if in the start-up procedure the system established itself on a lower mark such as 196, the offset is wrong. The flying knife will cut through the RA2 sheets at say line 206 and not between them. It is therefore, necessary to decide whether the upper or lower watermark position on the RA2 sheet is to be detected and to then set the flying knife synchronization. Although it is possible to synchronize with respect to either the upper or lower watermark on the RA2 sheet, in practice the upper mark, such as 198, is selected. It follows that it is not possible to detect every successive watermark, but every Mth mark is detected where M is an even number equal to 2 or greater. It will be seen from FIG. 10 that there is a uniform pitch between marks selected in this manner.

In order to ensure seizing on the upper mark of an RA2 sheet during normal running, the start-up procedure described above with reference to FIGS. 6 and 7 is modified and extended as shown in FIG. 11. The procedure of FIG. 11 is effectively inserted into the end of the procedure of FIG. 7 as indicated by the dash line TEST step 220 in that figure before transfer to the normal running procedure of FIG. 5. It will be assumed for explanation that M=2 (MCOUNT in FIG. 5 is equal to 1).

The modified start-up procedure introduces a test by which it determined whether the initial mark detected is an upper or lower mark on an RA2 sheet. The test is conducted in the narrow angle mode of the camera 40 and involves advancing an odd number of marks from that initially detected in the wide angle mode of FIG. 7 and detecting the position of a test mark which is the mark captured by the frame grab pulse generated at step 156 in FIG. 7. Appropriate count value parameters are set in step 156 in accordance with the procedure now to be described, The distance between the test mark and the initial mark will depend on whether the initial mark was an upper or lower mark. For simplicity of explanation in connection with FIG. 10, the odd number of marks will be chosen to be three. The web is advancing past the video camera in the direction A. Assume the initial mark detected by camera 40 in its wide angle setting is an upper sheet mark 208. As the web advances three marks, the test mark is 210, that is the lower sheet mark of the next RA2 sheet. It will be seen that the distance between the marks 208 and 210 is three A4 sheet lengths plus the trim margin between the sheets. If the A4 sheet length is called S, the distance between marks 208 and 210 is (3S+2t).

On the other hand if the initial detection was of lower sheet mark 196, then the third mark on would be the upper mark of the RA2 sheet (not shown) following sheet 192. In this case, because the test jumps sheet 192 altogether, there are two trim margins between the initial and test marks and the distance is (3S+4t). It is this difference in distance dependent on the initial mark position that provides the basis for the test procedure illustrated in FIG. 11.

Having captured an initial watermark in the wide angle mode in FIG. 7 and detected its position, the frame grab pulse from step 156 for the capture of the next watermark at a narrow angle setting, becomes part of the TEST procedure 220 at step 222 to establish the instant of the next frame grab pulse at which the next, test, watermark is to be detected. This is done in a special way such that the next, test, watermark detected will have a deliberately introduced offset error with respect to the predicted position. In terms of FIG. 4 the test mark will be detected in an offset position as shown in FIG. 4b) or 4c), the sense of the offset being dependent on whether the initially detected mark was an upper or lower mark on the A4 sheet. The frame grab pulse for the test mark generated at step 156 is set at a position (3S+3t) with reference to the position of the initial watermark. A count value corresponding to this distance (3S+3t) is stored for use in step 156 and the frame grab pulse generated accordingly as adjusted by the error offset $N_w$.

The position to the watermark image obtained by the test frame grab pulse is measured at step 224. It should have a value closely approximate to (3S+2t) or (3S+4t) measured from the initial mark. The offset (+t or −t) with respect to the reference position (3S+3t) is checked at step 226. If the offset is −t, that is the test mark lies below the reference position, the initial mark detected was a lower mark but the test mark was an upper mark on the RA2 sheet and the normal operation of FIG. 5 can be entered using the test mark as the base position.

However, if the test mark was at a position +t above the reference, it indicates that the initial mark detected was an upper mark on the RA2 sheet but that the test procedure has now advanced the system to a lower mark. In this case the test procedure is re-iterated through another odd number of A4 sheet marks so as to detect an upper A4 sheet mark.

When this is confirmed, the system continues to the normal operation routine of FIG. 5.

The procedure just discussed is adaptable to other large cut sheet sizes. For example, SRA2 also provides an irregular but repeated sequence of watermark spacings in the lengthwise direction. The procedure is also applicable to RA3 which is similar to RA2 but dimensioned to produce four A5 sheets per RA3 size sheet.

It will be understood that in running the procedure of FIG. 5 for RA2 or any other size of cut sheet, the appropriate base count values will be used as parameters. The entry to the normal running operation of FIG. 5 can be tied in with the procedure of FIG. 11 by starting the counting of pulses from encoder 32 within FIG. 5 at the time the test frame grab pulse is issued at step 156 in the same way as that pulse is used as the initial frame grab pulse in entering FIG. 5 directly from FIG. 7. However in the procedure of FIG. 11 the generation of the test frame pulse is set to create a deliberate offset error by which detection of an upper or lower mark is tested. Step 224 which in this case corresponds to the CALCULATE POSITION error $N_e$ to correct the position of the next watermark to be step 124 of FIG. 5, will thus produce this offset as the detected by adjustment of the SET NEWCOUNT value 128. However, this should only be applied if the test mark was a wanted upper mark on the RA2 ($N_e \approx -t$). On the other hand if the test mark proved to be a lower mark at step 226 and the procedure of FIG. 11 is re-iterated, then adjusting the SET NEWCOUNT value is inhibited and the FIG. 5 procedure re-starts on its base parameters as the TEST FRAME GRAB PULSE step 222 is repeated.

As mentioned earlier, the transmission of any cutter control pulses 24 to the sheeting machine 20 is inhibited by the gate 102 until it is established that conditions have been established in which the pulses are properly synchronized with detected watermarks.

An alternative approach to automatic acquisition of the series of watermarks will now be described. It has the merit of requiring a camera with just one narrow angle lens which is used both in acquisition and normal running.

It will be clear from FIG. 6 that if acquisition is done with the field of view 120 used in normal running, then the initial frame grab could acquire an area of plain paper between two successive marks so that nothing is detected. What is done to ensure acquisition is to generate a series of frame grab pulses at distance intervals along the web that are offset from the nominal watermark pitch to an extent which ensures that eventually a watermark will fall within the field of view. More specifically, it is preferred to select the offset so that the field of view advances or retards relative to the watermark with each field of view overlapping the previous one as regards their relative position between successive watermarks.

The search procedure for initially acquiring a watermark in this fashion is illustrated in FIGS. 12a–d and FIG. 13.

FIGS. 12a–d show successive frame grabs on different sections of the web 10. Although the figures are shown side by side, they represent sections along the web. For simplicity the watermarks are shown as rectangles 122 spaced along the web. In FIG. 12a, the first frame grab with the narrow field of view 120 appropriate to normal running falls between a pair of marks 122a and 122b and nothing is detected. Using the encoder pulses, the next frame grab pulse follows at a length interval of (nL+Δ) where n can range from 1 upwards, L is the nominal watermark pitch and Δ is an offset. Δ may be positive or negative. A positive value is illustrated. The next frame grab is shown in FIG. 12b where the field of view 120 falls again between two watermarks 122c and 122d. Without the offset Δ, the field of view would have fallen in the same relative position between successive marks as shown in FIG. 12a. This is indicated by the dotted line 120'. Similarly in FIG. 3, the field of view 120 from the third frame grab pulse advances to a position where it is close to acquiring the mark 122e. The next frame grab, once again advanced by (nL+Δ), captures the mark 122f, whose position is measured enabling the entry into the normal running procedure of FIG. 5.

A search mode procedure run under software control in the processor 100 is illustrated in FIG. 13 and replaces that of FIG. 7. In FIG. 13 a frame grab step 240 is effected at intervals (nL+Δ) determined by counting pulses from encoder 32 shown as step 242. The counting cycles at this interval until a positive mark detection inhibits the generation of further frame grab pulses from this source. The image captured at each frame grab pulse is subject to a mark detection procedure 244 which is essentially that described with reference to FIG. 8, steps 162–172, and FIGS. 9a–9d except that no mark position measurement is made until a positive detection of the presence of a watermark is obtained. This also inhibits further frame grab pulses derived from step 242. If positive detection is found the mark position within the field of view 120 is measured at step 246 and a prediction is made at step 248 for the generation of the next frame grab pulse that will bring the next mark captured into the reference position R—R in FIGS. 4 and 9d). Thereafter the normal running procedure of FIG. 5 is entered. The step 248 of FIG. 13 may not be needed since the captured mark within the field of view 120 cannot be too far from the reference axis R—R. It will be understood that various ways could be chosen to effect the transition from one operating mode to another. This is contrasted with the large deviation possible in initial capture of the watermark series using the wide angle field of view 146 in FIG. 6.

Applying this software control to the RA2 size sheets of FIG. 10, the routine 220 of FIG. 11 is inserted as a test procedure into that of FIG. 13 in the same way as was shown for FIG. 7.

It has been found in practice, that the search and mark acquisition procedure described with reference to FIGS. 12 and 13 enables a very fast acquisition with n set to 4 and a field of view 120 having a lengthwise extent of 0.2–0.25 L. Δ is set to achieve a rapid relative scan of the web with respect to the watermark position while ensuring sufficient overlap to ensure a proper watermark capture in one grab of the successive frame grabs. It will be appreciated that by using a narrow field of view at all times the best resolution of the captured image on the CCD detector array is also obtainable at all times.

Attention will now be given to the exposure speed of the camera and its effect on potential resolution and consistency of detection. As already discussed, it is advantageous in terms of cost to use readily available CCD video cameras. Current technology provides them with exposure speeds of 100–50 μS (1/10000 to 1/20000 seconds). The measurement resolution of the system described is potentially 0.1 mm but such resolution is not achievable at the quoted exposure speeds when the web is running at 300 m/min in the example given. The effective exposure speed can be improved by using a strobe flash. The use of a strobe is known in prior art as discussed above. The conventional lamp is an Xenon lamp which is capable of exposure times of 20 μS and possibly less. The Xenon strobe lamp provides a high intensity flash in the visible spectrum. Even a 20 μS exposure time does not totally freeze the image with reference to a 0.1 mm resolution, nor even would a 10 μS exposure time.

The Xenon strobe has other disadvantages. Reverting to the case taken by way of example earlier where the cut sheet size is A4 and every 4th watermark is detected, the frame grab pulses will be provided to the camera at a rate in the range of 4–5 pulses per second at a web speed of 300 m/min. This low frequency strobing has been found to be distracting to operatives. Also there is little or no control of the duration of the flash from a Xenon lamp. The lamps also have a relatively short life.

It is now proposed to use an infra-red strobe arrangement which is operable to have an exposure time at least as short as that of the best Xenon strobe and which does not adversely affect operatives because its radiation lies outside the visible spectrum.

To this end the backlight 42 in FIG. 1A and FIG. 5 is replaced by an infra-red strobe source further details of which are given below. The strobing of the infra-red source is done by simply applying the same frame grab pulse as is applied to the camera 40 as a trigger pulse to the infra-red source. This is shown by the dashed line connection 43 in FIG. 1A and FIG. 5.

Referring now to FIGS. 14 and 15, FIGS. 14a) and b) show diagrammatically a plan and side view of a preferred infra-red source. The source comprises an array 300 of high intensity, light emitting diodes 302 (LEDs) which radiate in the infra-red spectrum. The spacing of the diodes is determined by their illumination half-angle to give the most uniform intensity across the area to be illuminated. The uniformity of illumination is enhanced by placing an opal diffuser screen 304 between the LED array and the web indicated at 306 and moving in the direction of arrow A. Even with current high intensity LEDs, the IR light output is at a level that makes it desirable to mount the LEDs array 300 as a direct illumination source adjacent the web. A remote mounting of the LEDs coupled to a fibre-optic array terminating adjacent the web is a possibility if sufficient optical output is available.

FIG. 15 shows a block diagram of the circuitry for controlling and driving the LEDs.

The frame grab pulse on line 43 is applied as a trigger pulse to a delay circuit 310 which produces a predetermined pulse of adjustable delay. The purpose of the delay circuit is to ensure that the pulsing of LED array is correctly synchronized with the open shutter of camera 40 responding to the same frame grab pulse. The adjustability also enables allowance to be made for any delays occurring in the remainder of the LED drive circuitry. The delayed pulse output from delay circuit 310 is applied to the input of a driver pulse-forming circuit 312. This circuit is designed to produce a pulse of preset width (duration), say 10 μS duration, and of the required amplitude to drive the following main driver circuit 314. The main driver circuit comprises an array of drive transistors for the LEDs. The driver circuit is also made adjustable to control the drive current to the LEDs. It provides a drive pulse to the array 300 of a duration determined by circuit 312. The circuits 312 and 314 provide between them drive pulses to the LEDs which are of controlled duration and amplitude.

In summary the LED-based strobe source now proposed is faster than the existing shutter speeds available with CCD video cameras of the less expensive kind and is easy to synchronize with them. The IR radiation is invisible to the operator and does not cause distraction at the low strobe frequencies used. LEDs have fast rise and fall times providing the possibility of strobe flashes of much shorter duration than obtainable with Xenon lamps. Exposure times down to 2 μS may be possible. The intensity of the LED output is readily controllable. The lifetime of the LED array is expected to be many times longer than that of a Xenon bulb.

The choice of using a strobed light source for better resolution may well depend on the configuration of the watermarks being detected. As already indicated a degree of blurring from a lower resolution exposure may well be acceptable provided that consistent detection of a given mark configuration is achieved.

It is an advantage of CCD cameras that they have a good response into the infra-red. Operation of the above IR strobe at a near-infra-red wavelength is suitable with currently available LEDs and lies within the sensitivity range of current CCD cell arrays.

The use of a strobed light source whose radiation lies outside the visible spectrum and particularly in the infra-red is considered to be new in its own right and of potentially wider application than in the detection of marks on webs.

The processing system which has been described with particular reference to FIGS. 3 and 5 can be improved as regards speed of tracking response. It will be recalled acquired at the $T_o$ frame grab (FIG. 3) is entered at the that the NEWCOUNT value obtained from processing data next frame grab $T_1$ and is effective through the interval from $T_1$ to $T_2$. As indicated on FIG. 3 the interval between frame grab pulses is sufficient to allow processing to be completed within that interval. Even if processing could be completed within a period much shorter than the interval between frame grab pulses, there may be other good reasons for looking at every Mth mark as has been explained for the case of M=4 given by way of example. Even so improved tracking can be obtained if the NEWCOUNT value can be updated after data processing but before the next frame grab pulse is generated. In general the stability of the control system is enhanced the closer the implementation of the new value to the frame grab pulse which gave rise to it.

FIG. 16 illustrates a modification of the measurement and control loop 100 of FIG. 5. In the FIG. 16 circuit functions and process steps corresponding to those of FIG. 5 are given the same reference numerals.

The principle underlying FIG. 16 is that the NEWCOUNT value representing sheet length is divided into a standard component of predetermined value representing most of the sheet length plus an incremental component representing the remainder and accommodating the variation in sheet length. That is the sum of the standard and incremental components equals NEWCOUNT. If the processing from one frame grab pulse can be done during the counting of the standard value and the incremental value adjusted accordingly, then the full count can be completed on the adjusted incremental value. The concept of dividing the NEWCOUNT value in this way can be implemented in various ways.

In FIG. 16 a standard count value STD.COUNT is established as fixed value as part of an initialisation procedure indicated at 340. For the purposes of tracking sheets of watermarked stationery a fixed value of say 90% of the nominal sheet length is suitable. On the one hand, it must be a value below the lowest allowable sheet length. On the other hand it must allow sufficient processing time.

Although FIG. 16 is adaptable to the detection of every Mth watermark, consideration will first be given to a case where each successive watermark is detected for A4 sheets, that is M=1. In FIG. 16, the circuitry 140 is inactive and link 113 is made.

In this instance the STD.COUNT value is set to say 2700, about 90% of the nominal A4 sheet length of 2970 pulses from encoder 32. On generation of a frame grab pulse by generator 136, the image grabbed by the video camera is processed as described above through steps 114, 124 and 126. The error count $N_e$ between the predicted and measured position is obtained. Because M=1, the correction $N_c$ to the NEWCOUNT value equals $N_e$. A modified step 360 also calculates an incremental value $N_i$=NEWCOUNT—STD.COUNT. This incremental value is referred to as INC.COUNT and is set at step 362 as a comparator value for a modified counting routine.

In the modified routine, a counter 350 is reset by the same frame grab pulse from generator 136 that acquired the video data processed through steps 114 to 362. Counter 350 counts encoder pulses until the STD.COUNT value ($N_s$) is reached. The data processing time is less then the time to count $N_s$ encoder pulses so that when the STD.COUNT is achieved the INC.COUNT value has been set. On STD.COUNT being reached a reset 356 is sent to a second counter 356 which counts to the INC.COUNT value as indicated at step 358 (line 364 shown in the figure is inactive in the case of M=1). When the incremental count is complete the generator 136 is activated to issue the next frame grab pulse at a time which represents the current value of NEWCOUNT as calculated from the immediately preceding frame grab pulse. Thus there is a faster response to the measured errors. This is possible by the division of the calculated NEWCOUNT value into a STD.COUNT+INC.COUNT steps, with the calculations being completed within the STD.COUNT interval.

The concept just explained is extended to values of M greater than 1 and as with FIG. 5, M=4 will be used as an example. The circuitry 140 is active, link 113 is open so that frame grab pulses are provided every fourth cutter pulse generated by generator 136. The pulse generation is that shown in FIG. 3. Assume that as is indicated on that figure the data processing time is in excess of three interpolated pulse intervals. It is clear that in operation of the FIG. 16 control, a new value INC.COUNT resulting from a frame grab at $T_1$ will not be available until after the third interpolated pulse $t_{o3}$. These three pulses will be generated on the existing value of INC.COUNT obtained from frame grab pulse $T_0$. However, the new value of INC.COUNT can be applied to the generation of the next frame grab pulse $T_2$ (=$t_{o4}$) and will then apply to the next three interpolated pulses $t_{11}$, $t_{12}$ and $t_{13}$ and so forth. This is beneficial in that it is moving the timing of the next frame grab pulse and interpolated pulses around it closer to the frame grab pulse from which they stem.

In FIG. 3, $t_s - t_{o3} = N_s$ expressed in terms of pulses from encoder 32. Provided that the processing to set the new INC.COUNT value at step 362 in FIG. 16 is completed before $T_s$; the final incremental count to generate pulse $T_2$ will be done on the fresh INC.COUNT value. The position of $t_s$ is not fixed with respect to $T_1$ because it is constituted by three NEWCOUNT values+one STD.COUNT. Confusion could arise if the new INC.COUNT value was introduced during the time the incremental count loop 356, 358 was active. The incremental count in counter 356 might have already passed the value of the new INC.COUNT if the latter was less than the preceding value. To avoid confusion in the system, the line 364 connected to the standard count loop 350, 352 indicates a logic control of the step 362 such that a fresh INC.COUNT value can only be established for use with counter 356 whilst the standard count is less than $N_s$, that is within the standard count step. If the calculated INC.COUNT value is available at step 360 while the incremental loop is already counting to an existing INC.COUNT value, then the introduction of the fresh value is held until the next pulse from generator 136 resets counter 350 to start a fresh standard count cycle.

It will be appreciated that if the process time can be speeded to be completed between $t_{o2}$ and $t_{o3}$, then the same considerations apply. The new INC.COUNT value from frame grab pulse $T_1$ will then control the timing of pulses $t_{o3}$ and $t_2$ but if the new value is only available after incremental counting for $t_{o3}$ has already begun, then it will only apply to $T_2$. The ultimate ideal would be to complete processing from frame grab pulse $T_1$ within the interval to $t_{o1}$. If the processing could be guaranteed to be then less than the STD.COUNT interval, the logic control on line 364 would not be necessary.

The present invention has been described with reference to the detection of watermarks on a paper web intended to be cut into watermarked sheets. It will be recognized that the detection and tracking procedures described have potential application in the manufacture of watermarked paper. These procedures may be applied more generally to webs, whether of paper or other material, bearing repeated markings. These may be design marks of a trade mark nature or registration or other marks used in some production process performed on the material. In the paper field itself there are other forms of paper bearing marks akin to watermarks. One form of simulated watermark is made by introducing filler material into the web by a "printing" or stencilling process so that the mark is darker to transmitted light. Marks may also be made on the web at the press-section of a paper-making machine as the saturated web comes off the wire. Yet another form of marking is the formation of simulated watermarks on paper by laser energy such as is described in patent specifications EP-A-0329438.(which is equivalent to U.S. Pat. No. 4,961, 080) and EP-A-0384582 (which is equivalent to U.S. Pat. No. 5,352,495). The various kinds of marks on paper webs just described all show up in transmitted light. Other marks such as press marks that are applied to the surface of a web may be better detected by illuminating the sheet from the same side as the camera is placed.

We claim:

1. A method of generating discrete signals representative of the positions of a series of marks spaced at nominally known intervals along a paper web that is moving lengthwise, comprising the steps of:

a) capturing an image of a given mark of said series at a predetermined moment;

b) processing the captured image to compare the lengthwise position of said given mark at said predetermined moment to a lengthwise position predicted therefor as a result of processing of a previously captured image of a predecessor mark in said series, and generating a signal representative of the difference between the captured and predicted positions of said given mark; and c) predicting the moment for capturing an image of a subsequent mark of said series using said signal representative of the difference between the captured and predicted lengthwise positions of given mark.

2. A method as claimed in claim 1, in which said predetermined moments are established in terms of length of web run, and said predicted moments and detected positions are determined in terms of distances along the web.

3. A method as claimed in claim 2, in which the length of web run is done by means responsive to lengthwise movement of the web to generate a pulse for each predetermined length increment of the moving web.

4. A method as claimed in claim 2, in which the length of web run is measured with the aid of a rotatably-mounted means driven by the web and pulse-generating means driven by the rotatably-mounted means.

5. A method as claimed is claim 3, in which each predicted position is established as a count value, and said method further comprising adjusting said count value in accord with difference between the predicted position and detected position, and in which said predetermined moment of capturing said image of said given mark of said series is determined by counting a number of length increment pulses to a value determined by a current adjusted count value.

6. A method as claimed in claim 3, in which steps a) through c) are preformed for every Mth Mark along the web, where M is 2 or more, and an output pulse is generated at each corresponding predetermined moment, and for each of the interventing marks, intervening mark output pulses are generated at moments corresponding to the distance between successive detected marks divided by M.

7. A method as claimed in claim 1 applied to the detection of watermarks on a web of paper that is being advanced to a sheeting machine, the mark detection procedure being applied to detect watermarks that will be contained within sheets to be cut from the web and being employed to generate cutter control pulses for the sheeting machine.

8. A method as claimed in claim 1, further comprising the steps of:

d) repeating steps a) and b), wherein in said repeated steps of subsequent mark from step c) is used as the given mark and the moment predicted in step c) is used as the predetermined moment; and e) predicting the moment for capturing an image of a further subsequent mark of said series using the signal representative of the difference between the captured and predicted lengthwise positions of said subsequent mark obtained in step d).

9. A method as claimed in claim 8, wherein in step c) said difference-representative signal is used in a manner that reduces toward zero the difference-representative signal obtained in step d).

10. A method as claimed in claim 1 wherein the image captured in step a) is contained within a frame of reference and the processing in step b) includes determining the lengthwise position of said given mark with said frame of reference and comparing the determined lengthwise position to a reference lengthwise position within said frame of reference to generate said difference-representative signal.

11. A method as claimed in claim 10 wherein in step c) the moment predicted for capturing an image of said subsequent mark is the moment at which said subsequent mark is predicted to be at said reference position in said frame of reference.

12. A method as claimed in claim 8 wherein the image captured in step a) is contained within a frame of reference and the processing in step b) includes determining the lengthwise position of said given mark with said frame of reference and comparing the determined lengthwise position to a reference lengthwise position within said frame of reference to generate said difference-representative signal; and wherein in step c) the moment predicted for capturing an image of said subsequent mark in step d) is the moment at which said subsequent mark is predicted to be at said reference position in said frame of reference.

13. A method as claimed in claim 1 further comprising the step of measuring the length of web run and expressing said predetermined and predicted moments in terms of lengths along the web.

14. A method of detecting a predetermined mark made at nominally known intervals along a web of material, comprising the steps of:

moving the web lengthwise past a detection apparatus;

initiating a mark detection procedure to capture a virtually instantaneous image of a portion of the web at predetermined moments;

comparing the position in the lengthwise direction of the web at the relevant moment for each mark detected to a position predicted from the detection of a previously detected mark to determine the difference between the detected and the predicted positions; and predicting the moment of initiating the detection procedure to capture an image of each detected mark using the difference between the detected and predicted positions of said previously detected mark.

15. A method as claimed in claim 14, in which the mark detection procedure includes obtaining an image of an area of the web at each predetermined moment that substantially freezes the motion of the web, and examining the image area to detect the position of a mark in the lengthwise direction.

16. A method as claimed in claim 15, in which the detected position is compared with a reference position within the image area, and each predicted position is based on the supposition that the position of the subsequent mark to which it relates is to be at the reference position within the image area.

17. A method as claimed in claim 16, in which the reference position within the image area is the predicted position of the mark.

18. A method as claimed in claim 15, in which the image area is viewed by a camera and operated with an exposure time that substantially freezes the web motion, the image captured by the camera is digitized to form a numerical array, and the numerical array is processed to detect a predetermined mark and measure its position.

19. A method as claimed in claim 18, in which said exposure time is determined by a strobe illumination source associated with the camera to illuminate the image area.

20. A method as claimed in claim 19, in which the strobe illumination source produces light outside the visible spectrum.

21. A method as claimed in claim 20, in which the illumination source produces light in the infra-red spectrum.

22. A method as claimed in claim 18, in which the numerical array represents a matrix array of image pixels and the processing is performed such as to scan the matrix array from one end thereof in the lengthwise direction of the web.

23. A method as claimed in claim 15, in which the web is viewed from one side of the web and back-lit at the other side.

24. A method as claimed in claim 14 applied to the detection of watermarks on a web of paper that is being advanced to a sheeting machine, the mark detection procedure being applied to detect watermarks that will be contained within sheets to be cut from the web and being employed to generate cutter control pulses for the sheeting machine.

25. A method of generating discrete signals representative of the positions of a series of marks spaced at nominally known intervals along a paper web that is moving lengthwise, comprising the steps of:

a) capturing an image of a given mark of said series at a predetermined moment;

b) processing the captured image to compare the lengthwise position of said given mark at said predetermined moment to a lengthwise position predicted therefor as a result of processing of a previously captured image of a predecessor mark in said series, and generating a signal representative of the difference between the captured and predicted positions of said given mark; and c) predicting the moment for capturing an image of a subsequent mark of said series using said signal representative of the difference between the captured and predicted lengthwise positions of the given mark;

wherein said predetermined moments are established in terms of length of web run, and said predicted moments and detected positions are determined in terms of distance along the web;

wherein each predicted position is established as a count value, and said method further comprising adjusting said count value in accord with difference between the predicted position and detected position, and in which said predetermined moment of capturing said image of said given mark of said series is determined by counting a number of length increment pulses to a value determined by a current adjusted count value; and wherein the counting of length increment pulses re-starts at each predetermined moment and the next predetermined moment is that at which the number of length increment pulses counted equals the current adjusted count value.

26. A method of generating discrete signals representative of the positions of a series of marks spaced at nominally known intervals along a paper web that is moving lengthwise, comprising the steps of:

a) capturing an image of a given mark of said series at a predetermined moment;

b) processing the captured image to compare the lengthwise position of said given mark at said predetermined moment to a lengthwise position predicted therefor as a result of processing of a previously captured image of a predecessor mark in said series, and generating a signal representative of the difference between the captured and predicted positions of said given mark; and c) predicting the moment for capturing an image of a subsequent mark of said series using said signal representative of the difference between the captured and predicted lengthwise positions of the given mark;

wherein said predetermined moments are established in terms of length of web run, and said predicted moments and detected positions are determined in terms of distances along the web;

wherein each predicted position is established as a count value and said method further comprising adjusting said count value in accord with difference between the predicted position and detected position, and in which said predetermined moment of capturing said image of said given mark of said series is determined by counting a number of length increment pulses to a value determined by a current adjusted count value; and wherein the step of adjusting said count value is performed during a next, or a subsequent, predetermined moment.

27. A method as claimed in claim 26, in which said count value comprises a first part and a second part, and said adjusting of the count value is done by adjusting said second part during the counting of said first part.

28. A method of acquiring and tracking a series of predetermined marks made at nominally known intervals along a web of material in which:

A) moving the web lengthwise past a detection apparatus;
B) initiating a first mark acquisition procedure by:
 i) capturing an image of a first predetermined area in the plane of the surface to thereby image the portion of the web within that area at the moment of capture;
 ii) said predetermined area having a dimension in the lengthwise direction sufficient to ensure that one of said series of marks is within the captured image;
 iii) determining the position of said one mark in the lengthwise direction of the web with respect to a reference position within said predetermined area; and
 iv) predicting the position of a succeeding mark of said series using the offset of said one mark with respect of said reference position;
C) initiating a second mark acquisition procedure by:
 i) capturing an image of a second predetermined area in the plane of the web to thereby image the portion of the web within that area at the moment of capture and defining the moment of capture in accord with the predicted position;
 ii) said second predetermined area having a dimension in the lengthwise direction less than that of said first predetermined area such that not more than one of said series of marks can be located within said second predetermined area at the moment of capture;
 iii) determining the position of said succeeding mark in the lengthwise direction with respect to a reference position within said second predetermined area; and
 iv) predicting the position of another succeeding mark of said series using the knowledge of the offset of the first-mentioned succeeding mark from the reference position in the second predetermined area; and
D) repeating said second mark acquisition procedure for the other succeeding mark to predict the position of yet another succeeding mark and so on.

29. A method of acquiring a series of predetermined marks made at nominally fixed intervals along a web of material and interleaved with a second series of the same marks that are not equidistant between adjacent marks of the first series comprising the steps of:

A) moving the web lengthwise past a detection apparatus;
B) initiating a first mark acquisition procedure by:
 i) capturing an image of a predetermined area in the plane of the surface to thereby image the portion of the web within that area at the moment of capture;
 ii) said predetermined area having a dimension in the lengthwise direction sufficient to ensure that one of said series of marks is within the captured image;
 iii) determining the position of said one mark in the lengthwise direction of the web with respect to a reference position within said predetermined area; and
 iv) establishing the moment of image capture of a succeeding mark in the other series using the offset of said one mark with respect of said reference position, said moment being established such that the succeeding mark of the other series is offset to one side or the other of said reference position in dependence on whether said succeeding mark is in the first or second series;
C) initiating a second mark acquisition procedure by:
 i) capturing, at said established moment, an image of a predetermined area in the plane of the web to thereby image the portion of the web within that area at the moment of capture; and ii) determining the offset of the position of said succeeding mark in the lengthwise direction with respect to said reference position to determine to which series the succeeding mark belongs.

30. A method according to claim 29 in which if the offset of the succeeding mark is of one sense with respect to the reference position, a detection procedure for another mark in the same series is initiated based on a prediction of the position of the other mark made from the measured position of said succeeding mark; and in which if the offset of the succeeding mark is of the opposite sense, steps B(iv) and C are repeated treating the succeeding mark as the one mark.

* * * * *